(12) United States Patent
Kong et al.

(10) Patent No.: US 12,455,645 B2
(45) Date of Patent: Oct. 28, 2025

(54) TOUCH DISPLAY DEVICE

(71) Applicant: LG Display Co., Ltd., Seoul (KR)

(72) Inventors: MinSuk Kong, Paju-si (KR); Youngjin Choe, Paju-si (KR); MiRae Lee, Paju-si (KR); YoungJun Jeon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/476,073

(22) Filed: Sep. 27, 2023

(65) Prior Publication Data

US 2024/0256062 A1 Aug. 1, 2024

(30) Foreign Application Priority Data

Jan. 31, 2023 (KR) .................. 10-2023-0013201

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 2203/04112* (2013.01)

(58) Field of Classification Search
None
See application file for complete search history.

(56) References Cited

U.S. PATENT DOCUMENTS

| | | | |
|---|---|---|---|
| 10,754,461 B2 | 8/2020 | Pak et al. | |
| 11,099,697 B2 | 8/2021 | Kim et al. | |
| 11,157,102 B2 | 10/2021 | Lee et al. | |
| 2014/0056449 A1* | 2/2014 | Noro | H04R 17/00 381/190 |
| 2015/0015532 A1* | 1/2015 | Choung | G06F 3/0446 345/174 |
| 2015/0363024 A1 | 12/2015 | Hayashi et al. | |
| 2017/0364179 A1* | 12/2017 | Jung | G06F 3/0443 |
| 2019/0121474 A1* | 4/2019 | Lee | G06F 3/0443 |
| 2019/0131379 A1* | 5/2019 | Won | G06F 3/0446 |
| 2019/0258338 A1* | 8/2019 | Park | G06F 3/0446 |

(Continued)

FOREIGN PATENT DOCUMENTS

| | | |
|---|---|---|
| JP | 2011059771 A | 3/2011 |
| JP | 2019091349 A | 6/2019 |

(Continued)

*Primary Examiner* — William Boddie
*Assistant Examiner* — Bipin Gyawali
(74) *Attorney, Agent, or Firm* — Seed Intellectual Property Law Group LLP

(57) ABSTRACT

Disclosed is a display device with an integrated touch screen comprising a substrate; a display device comprising a plurality of pixels disposed on the substrate; and a first touch electrode and a second touch electrode disposed on the display device, the first touch electrode includes a first sub-touch electrode and a second sub-touch electrode, the second touch electrode includes a third sub-touch electrode and a fourth sub-touch electrode, and a position of a plurality of open parts disposed between the first sub-touch electrode and the third sub-touch electrode or between the second sub-touch electrode and the fourth sub-touch electrode, is adjusted so that a virtual line connecting the plurality of open parts is not in a straight line.

19 Claims, 11 Drawing Sheets

(56) References Cited

U.S. PATENT DOCUMENTS

| | | | |
|---|---|---|---|
| 2020/0117304 A1* | 4/2020 | Lee | G06F 3/0443 |
| 2021/0240303 A1 | 8/2021 | Blondin et al. | |
| 2021/0373708 A1* | 12/2021 | Kim | G06F 3/0412 |
| 2022/0147190 A1* | 5/2022 | Chen | G06F 3/0446 |
| 2022/0171499 A1* | 6/2022 | Han | G06F 3/0412 |
| 2023/0100542 A1* | 3/2023 | Choi | G06F 3/04164 |
| | | | 345/173 |
| 2024/0074280 A1* | 2/2024 | Bok | H10K 59/00 |
| 2025/0169324 A1* | 5/2025 | Bok | H10K 59/40 |

FOREIGN PATENT DOCUMENTS

| | | |
|---|---|---|
| KR | 20180131203 A | 12/2018 |
| KR | 20190044953 A | 5/2019 |
| KR | 20200005707 A | 1/2020 |
| TW | 201928621 A | 7/2019 |
| WO | WO 2020029371 A1 | 2/2020 |

* cited by examiner

TOUCH DISPLAY DEVICE

CROSS-REFERENCE TO RELATED APPLICATIONS

This application claims the benefit of the Korean Patent Application No. 10-2023-0013201 filed on Jan. 31, 2023, which is hereby incorporated by reference as if fully set forth herein.

BACKGROUND

Technical Field

The present disclosure relates to a display device with an integrated touch screen with an integrated screen.

Description of the Related Art

As the information society develops, demands for display devices for displaying images are increasing in various forms. As a result, various displays such as Liquid Crystal Display (LCD), Plasma Display Panel (PDP), and Organic Light Emitting Display (OLED) have recently been used. Among these, the organic light emitting display device is capable of driving low voltage, is thin, has an excellent viewing angle, and has a high response speed.

An organic light emitting display device includes data lines, gate lines, a display panel with multiple pixels formed at the intersection of the data lines and the gate lines, a gate driver that supplies gate signals to the gate lines, and a data driver that supplies data voltages to the data lines. Each pixel includes an organic light emitting device, a driving transistor that adjusts the amount of current supplied to the organic light emitting device according to the voltage of the gate electrode, and a scan transistor that supplies the data voltage of the data line to the gate electrode of the driving transistor in response to the gate signal of the gate line.

Recently, the organic light emitting display device is formed as a display device with integrated touch screen including a touch screen panel capable of recognizing a user's touch. In this case, the organic light emitting display device also functions as a touch screen device. Recently, touch screen devices have been applied to monitors such as navigation, industrial terminals, laptops, financial automation devices, and game consoles, portable terminals such as smartphones, tablets, mobile phones, MP3, PDA, PMP, PSP, portable game consoles, DMB receivers and tablet PCs, and home appliances such as refrigerators, microwave ovens, washing machines, etc. In addition, the application of touch screen devices is gradually expanding due to the advantage that anyone can easily operate these devices.

The display device with the integrated touch screen forms first touch electrodes, second touch electrodes, and bridge electrodes for connecting the first touch electrodes or the second touch electrodes to each other in the display panel. The first touch electrodes may be transmitter (Tx) electrodes, and the second touch electrodes may be receiver (Rx) electrodes.

BRIEF SUMMARY

The present disclosure has been made in view of the above problems, and it is an object of the present disclosure to provide a display device with an integrated touch screen for improving visibility in a boundary region formed between first touch electrodes and second touch electrodes.

In accordance with an aspect of the present disclosure, the above and other objects can be accomplished by the provision of a display device with an integrated touch screen comprising a substrate; a display element including a plurality of pixels having a red pixel, a green pixel, and a blue pixel disposed on the substrate; and a first touch electrode and a second touch electrode disposed on the display element, wherein the first touch electrode includes a plurality of first sub-touch electrodes extending in a first direction and a plurality of second sub-touch electrodes extending in a second direction, the second touch electrode includes a plurality of third sub-touch electrodes extending in the first direction and a plurality of fourth sub-touch electrodes extending in the second direction, the first touch electrode and the second touch electrode are not electrically connected by a plurality of open parts disposed between the plurality of first sub-touch electrodes and the plurality of third sub-touch electrodes, and between the plurality of second sub-touch electrodes and the plurality of fourth sub-touch electrodes, a virtual line connecting the plurality of open parts does not form a straight line, the plurality of open parts include a first open part disposed between one end of any one first sub-touch electrode among the plurality of first sub-touch electrodes and one end of any one third sub-touch electrode among the plurality of third sub-touch electrodes, and a second open part disposed between one end of any one second sub-touch electrode among the plurality of second sub-touch electrodes and one end of any one fourth sub-touch electrode among the plurality of fourth sub-touch electrodes, the first open part is disposed adjacent to the blue pixel, and a shortest distance between one end of the first open part and the plurality of second sub-touch electrodes is shorter than a shortest distance between another end of the first open part and the plurality of fourth sub-touch electrodes.

Accordingly, the first touch electrodes and the second touch electrodes are spaced apart from each other, and in this case, a pattern formed between the first touch electrodes and the second touch electrodes in a region where the first touch electrodes and the second touch electrodes intersect or face each other.

BRIEF DESCRIPTION OF THE SEVERAL VIEWS OF THE DRAWINGS

The above and other objects, features and other advantages of the present disclosure will be more clearly understood from the following detailed description taken in conjunction with the accompanying drawings, in which:

FIG. 3 is an enlarged view of the X region of FIG. 2.

FIG. 4 is an enlarged view of an area A of FIG. 3.

FIG. 5 is an enlarged view of an area A of FIG. 3.

FIG. 6 is an enlarged view of an area A of FIG. 3.

FIG. 7 is an enlarged view of an area A of FIG. 3.

FIG. 8 is an enlarged view of a region B of FIG. 3.

FIG. 9 is an enlarged view of a region B of FIG. 3.

DETAILED DESCRIPTION

Figure 1:
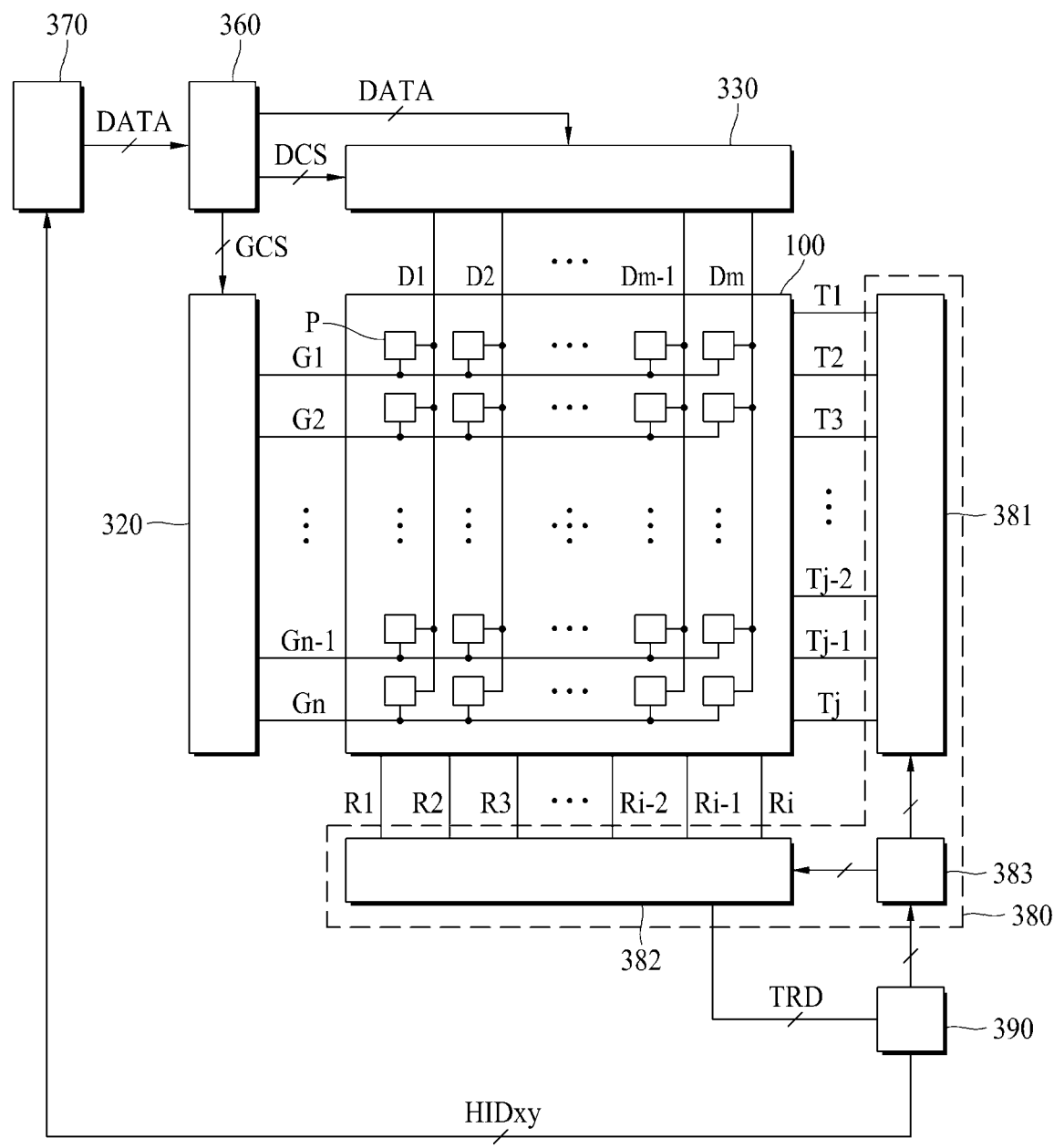
FIG. 1 is a block diagram illustrating a display device with an integrated touch screen according to an embodiment of the present disclosure.

Advantages and features of the present disclosure, and implementation methods thereof will be clarified through the following embodiments, described with reference to the accompanying drawings. The present disclosure may however, be embodied in different forms and should not be construed as being limited to the embodiments set forth herein. Rather, these embodiments are provided so that this disclosure will be thorough and complete, and will fully convey the scope of the present disclosure to those skilled in the art.

The shapes, sizes, dimensions (e.g., length, width, height, thickness, radius, diameter, area, etc.), ratios, angles, and numbers disclosed in the drawings for describing embodiments of the present disclosure are merely examples, and thus the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

In the case in which "comprise," "have," and "include" described in the present specification are used, another part may also be present unless "only" is used. The terms in a singular form may include plural forms unless noted to the contrary.

In construing an element, the element is construed as including an error region although there is no explicit description thereof.

In describing a positional relationship, for example, when the positional order is described as "on," "above," "below," "beneath," and "next," the case of no contact therebetween may be included, unless "just" or "direct" is used.

If it is mentioned that a first element is positioned "on" a second element, it does not mean that the first element is essentially positioned above the second element in the figure. The upper part and the lower part of an object concerned may be changed depending on the orientation of the object. Consequently, the case in which a first element is positioned "on" a second element includes the case in which the first element is positioned "below" the second element as well as the case in which the first element is positioned "above" the second element in the figure or in an actual configuration.

In describing a temporal relationship, for example, when the temporal order is described as "after," "subsequent," "next," and "before," a case which is not continuous may be included, unless "just" or "direct" is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other, and may be variously inter-operated with each other and driven technically The embodiments of the present disclosure may be carried out independently from each other, or may be carried out together in a co-dependent relationship.

In the drawings, the same or similar elements are denoted by the same reference numerals even though they are depicted in different drawings.

In the embodiments of the present disclosure, a source electrode and a drain electrode are distinguished from each other, for convenience of explanation. However, the source electrode and the drain electrode are used interchangeably. Thus, the source electrode may be the drain electrode, and the drain electrode may be the source electrode. Also, the source electrode in any one embodiment of the present disclosure may be the drain electrode in another embodiment of the present disclosure, and the drain electrode in any one embodiment of the present disclosure may be the source electrode in another embodiment of the present disclosure.

In one or more embodiments of the present disclosure, for convenience of explanation, a source region is distinguished from a source electrode, and a drain region is distinguished from a drain electrode. However, embodiments of the present disclosure are not limited to this structure. For example, a source region may be a source electrode, and a drain region may be a drain electrode. Also, a source region may be a drain electrode, and a drain region may be a source electrode.

FIG. 1 is a block diagram illustrating a display device with an integrated touch screen according to an embodiment of the present disclosure.

Referring to FIG. 1, a display device with the integrated touch screen according to an embodiment of the present disclosure includes a display panel 100, a gate driver 320, a data driver 330, a timing controller 360, a host system 370, a touch driver 380 and a touch coordinate calculation unit 390.

The display device with the integrated touch screen according to an embodiment of present disclosure may be implemented as a liquid crystal display (LCD), a field emission display (FED), a plasma display panel (PDP), an organic light emitting display (OLED), an electrophoresis display (EPD), etc. In the following embodiment, a display device with an integrated touch screen according to an embodiment of the present disclosure will be mainly described as an organic light emitting display device, but it should be noted that the present disclosure is not limited thereto.

The display panel 100 includes a display area in which pixels P are provided to display an image. Data lines D1 to Dm, where m is a positive integer of 2 or more and gate lines G1 to Gn, where n is a positive integer of 2 or more are formed on the display panel 100. The data lines D1 to Dm may be formed to cross the gate lines G1 to Gn. The pixels P may be formed in an area defined by an intersection structure between the gate lines and the data lines.

Each of the pixels P of the display panel 100 may be connected or coupled to any one of the data lines D1 to Dm and any one of the gate lines G1 to Gn. Each of the pixels P of the display panel 100 may include a driving transistor that adjusts a drain-source current according to a data voltage applied to the gate electrode, a switching transistor that supplies a data voltage of a data line to the gate electrode of the driving transistor, an organic light emitting diode that emits light according to the drain-source current of the driving transistor, and a capacitor for storing a voltage of a gate electrode of the driving transistor. Therefore, each of the pixels P may emit light according to a current supplied to the organic light emitting diode.

The gate driver 320 receives a gate control signal GCS from the timing controller 360. The gate driver 320 supplies gate signals to the gate lines G1 to Gn according to the gate control signal GCS.

The gate driver 320 may be formed in a non-display area outside one or both sides of the display area of the display panel 100 in a gate-in-panel (GIP) manner. Alternatively, the gate driver 320 may be made of a driving chip, mounted on a flexible film, and attached to a non-display area outside one or both sides of the display area of the display panel 100 by tape automated bonding TAB.

The data driver 330 receives the digital video data DATA and the data control signal DCS from the timing controller 360. The data driver 330 converts the digital video data DATA into an analog positive/negative data voltage according to the data control signal DCS and supplies the same to the data lines. That is, pixels to which data voltages are to be supplied are selected by gate signals of the gate driver 320, and data voltages are supplied to the selected pixels.

The data driver 330 may include a plurality of source drive ICs. Each of the plurality of source drive Ics may be mounted on a flexible film in a chip on film COF or chip on plastic COP manner. The flexible film is attached to pads provided in the non-display area of the display panel 100 using an anisotropic conducting film, thereby connecting the plurality of source drive Ics to the pads.

The timing controller 360 receives digital video data DATA and timing signals from the host system 370. The timing signals may include a vertical synchronization signal, a horizontal synchronization signal, a data enable signal, a dot clock, and the like. The vertical synchronization signal is a signal defining one frame period. The horizontal synchronization signal is a signal defining one horizontal period required to supply data voltages to pixels of one horizontal line of the display panel DIS. The data enable signal is a signal defining a period in which valid data is input. The dot clock is a signal repeated in a predetermined short period.

The timing controller 360, to control the operation timing of the gate driver 320 and the data driver 330, generates a data control signal DCS for controlling the operation timing of the data driver 330 and a gate control signal GCS for controlling the operation timing of the gate driver 320 based on the timing signals. The timing controller 360 outputs the gate control signal GCS to the gate driver 320 and outputs the digital video data DATA and the data control signal DCS to the data driver 330.

The host system 370 may be implemented as a navigation system, a set-top box, a DVD player, a Blu-ray player, a personal computer PC, a home theater system, a broadcast receiver, a phone system, or the like. The host system 370 converts the digital video data DATA of the input image into a format suitable for displaying on the display panel 100, including a system on chip SoC with a built-in scaler. The host system 370 transmits the digital video data DATA and the timing signals to the timing controller 360.

First and second touch electrodes may be formed on the display panel 100 in addition to the data lines D1 to Dm and the gate lines G1 to Gn. The first touch electrodes may be formed to cross the second touch electrodes. The first touch electrodes may be connected to the first touch driver 381 through first touch lines T1 to Tj, where j is a positive integer of 2 or more. The second touch electrodes may be connected to the second touch driver 382 through second touch lines R1 to Ri, where, i is a positive integer of 2 or more. A touch sensor may be formed in each of the intersections of the first touch electrodes and the second touch electrodes. In an embodiment of present disclosure, it is illustrated that the touch sensor is implemented with mutual capacitance, but it should be noted that the touch sensor is not limited thereto.

The touch driver 380 supplies a driving pulse to the first touch electrodes through the first touch lines T1 to Tj and senses a charge change amount of each of the touch sensors through the second touch lines R1 to Ri. That is, in FIG. 1, the first touch lines T1 to Tj are Tx lines for supplying driving pulses, and the second touch lines R1 to Ri are Rx lines for sensing charge variation of each of the touch sensors.

The touch driver 380 includes a first touch driver 381, a second touch driver 382, and a touch controller 383. The first touch driver 381, the second touch driver 382, and the touch controller 383 may be integrated in one Read-out IC ROIC.

The first touch driver 381 selects a first touch line to output a driving pulse under the control of the touch controller 383, and supplies the driving pulse to the selected first touch line. For example, the first touch driver 381 may sequentially supply driving pulses to the first touch lines T1 to Tj.

The second touch driver 382 selects second touch lines to receive charge changes of touch sensors under the control of the touch controller 383, and receives charge changes of touch sensors through the selected second touch lines. The second touch driver 382 samples charge changes of touch sensors received through the second touch lines R1 to Ri and converts them into touch raw data TRD, which is digital data.

The touch controller 383 may generate a Tx setup signal for setting a first touch line to which a driving pulse will be output from the first touch driver 381 and an Rx setup signal for setting a second touch line to receive a touch sensor voltage from the second touch driver 382. In addition, the touch controller 383 generates timing control signals for controlling the operation timing of the first touch driver 381 and the second touch driver 382.

The touch coordinate calculation unit 390 receives touch raw data TRD from the touch driver 380. The touch coordinate calculation unit 390 calculates the touch coordinates according to the touch coordinate calculation method and outputs touch coordinate data HIDxy including information of the touch coordinates to the host system 370.

The touch coordinate calculation unit 390 may be implemented as a micro controller unit MCU. The host system 370 analyzes touch coordinate data HIDxy input from the touch coordinate calculation unit 390 and executes an application program associated with the coordinates in which the touch is generated by the user. The host system 370 transmits digital video data DATA and timing signals to the timing controller 360 according to the executed application program.

The touch driver 380 may be included in the source drive Ics or may be manufactured as a separate driving chip and mounted on the circuit board. In addition, the touch coordinate calculation unit 390 may be made of a driving chip and mounted on a circuit board.

Figure 2:
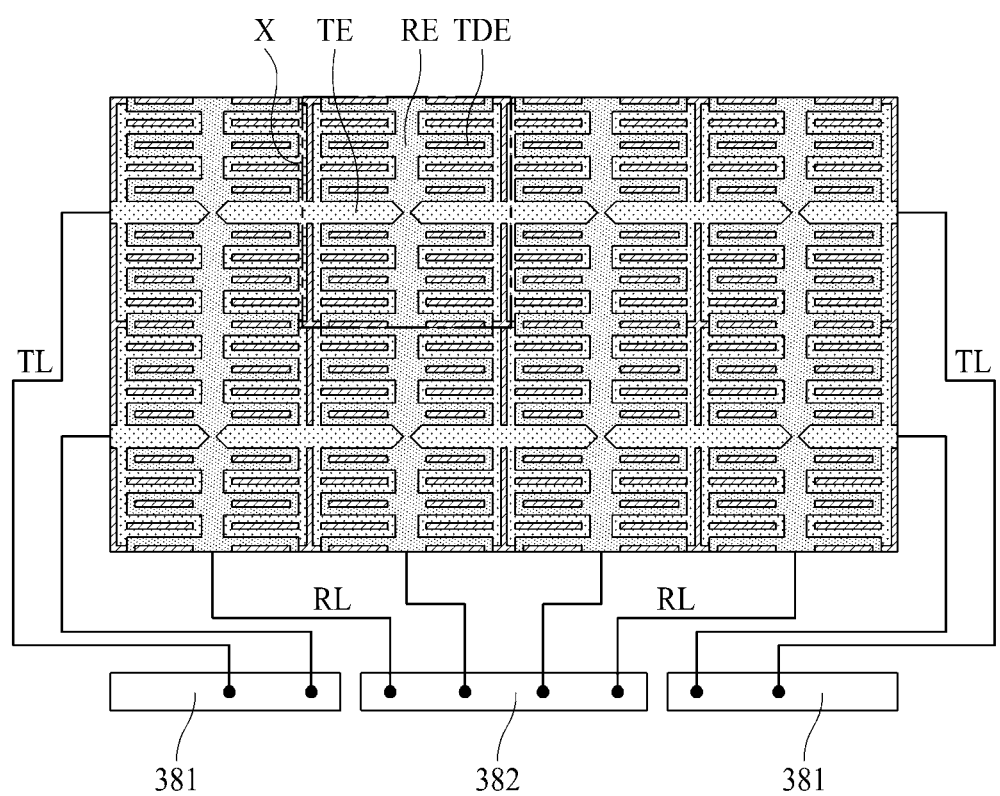
FIG. 2 is a plan view of a touch electrode according to an embodiment of the present disclosure.

FIG. 2 is a plan view of a display device with the integrated touch screen according to an embodiment of the present disclosure.

As shown in FIG. 2, the display device with the integrated touch screen according to an embodiment of present disclosure includes first touch electrodes TE, second touch electrodes RE, touch dummy electrodes TDE, first touch line TL, second touch line RL, the first touch driver 381, and the second touch driver 382.

According to an embodiment of the present disclosure, a unit cell structure X on the drawing indicated by a dotted line in FIG. 2 is repeatedly provided on the display panel 100, thereby serving as a touch sensor. Meanwhile, the first touch electrodes TE, and the second touch electrodes RE of the display device with the integrated touch screen according to an embodiment of present disclosure are not limited to the repeated arrangement of the unit cell structure X, the first touch electrodes TE and the second touch electrodes RE of the touch display device may be formed by repeatedly arranging a plurality of first touch electrodes TE and a plurality of second touch electrodes RE in a rhombus shape in a horizontal and vertical direction.

According to an embodiment of present disclosure, as illustrated in FIG. 2, the unit cell structure X is repeatedly arranged four times in the horizontal direction (a first direction) and two times in the vertical direction (a second direction) of the Figure, but present disclosure is not limited thereto, and the unit cell structure X can be repeatedly arranged in various numbers according to the size of the display panel 100. The first direction is transverse to the second direction in one embodiment.

As the unit cell structure X is repeatedly arranged, the first touch electrodes TE may extend in the horizontal direction in the same row. Specifically, the first touch electrodes TE may extend from one end, for example, left end to the other end, for example, right end of the display panel 100 in the same row.

Meanwhile, the first touch electrode TE may be electrically connected through a bridge electrode (not shown) at an intersection of the first touch electrode TE extending in the horizontal direction and the second touch electrode RE extending in the vertical direction The first touch electrode TE may be electrically connected to receive the same signal in the same row, but may not be electrically connected to each other in different rows and receive different signals.

According to an embodiment of the present disclosure, the first touch electrode TE may be connected to the first touch line TL provided at one end thereof. In this case, the first touch line TL may be extended to be electrically connected to the first touch driver 381 through a touch pad electrode (not shown). Accordingly, the first touch electrode TE may receive a signal from the first touch driver 381.

As the unit cell structures X are repeatedly arranged, the second touch electrodes REs may extend in the vertical direction in the same column. Specifically, the second touch electrodes RE may extend from one end, for example, top end, to the other end, for example, to bottom end of the display panel 100 in the same column.

The second touch electrode RE may be electrically connected in the same column to transmit the same signal, but is not electrically connected in different column to transmit different signals.

According to an embodiment of the present disclosure, the second touch electrode RE may be connected to the second touch line RL provided in the one end thereof. In this case, the second touch line RL may be extended to be electrically connected to the second touch driver 382 through a touch pad electrode (not shown). Accordingly, the second touch electrode RE may transmit a signal to the second touch driver 382.

According to an embodiment of the present disclosure, by repeatedly forming the unit cell structure X, a touch signal may be sensed by measuring a mutual capacitance generated between the first touch electrodes TE and the second touch electrodes RE, and detailed descriptions of the unit cell structure X will be described below with reference to FIG. 3.

Figure 3:
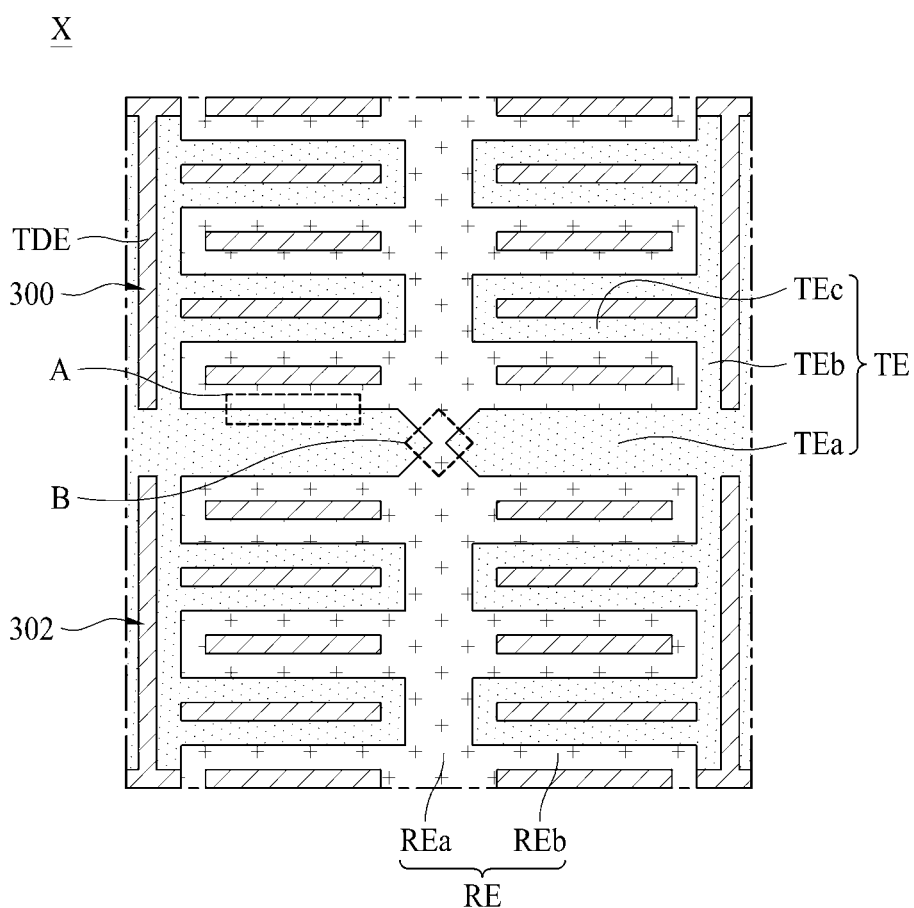
FIG. 3 is a plan view of a unit of a touch electrode according to an embodiment of the present disclosure. In this case.

FIG. 3 is a schematic diagram of a unit of a touch electrode according to an embodiment of the present disclosure. In this case, FIG. 3 corresponds to an enlarged plan view of the unit cell structure X of FIG. 2.

As shown in FIG. 3, the unit cell structure X of the touch electrode according to an embodiment of the present disclosure includes the first touch electrode TE, the second touch electrode RE, and the touch dummy electrode TDE.

The first touch electrode TE, the second touch electrode RE, and the touch dummy electrode TDE may have a multilayer structure formed of a metal material such as molybdenum Mo, silver Ag, titanium Ti, copper Cu, aluminum Al, titanium/aluminum/titanium Ti/Al/Ti, molybdenum/aluminum/molybdenum Mo/Al/Mo.

The first touch electrode TE, the second touch electrode RE, and the touch dummy electrode TDE may be formed of a same material in a same process. Accordingly, the first touch electrode TE, the second touch electrode RE, and the touch dummy electrode TDE may be formed on a same layer.

According to an embodiment of the present disclosure, the first touch electrodes TE, the second touch electrodes RE, and the touch dummy electrodes TDE are assured of not being short-circuited with each other, and thus may be spaced apart from each other. That is, the first touch electrodes TE, the second touch electrodes RE, and the touch dummy electrodes TDE may not be connected to each other. Since the electrodes TE, RE, TDE are not connected in a boundary area formed between the electrodes TE, RE, TDE, it is possible to prevent the electrodes TE, RE, TDE from being short-circuited.

According to an embodiment of the present disclosure, the first touch electrode TE includes a first body part TEa, a first extension part TEb, and a first protrusion part TEc, and the second touch electrode RE includes a second body part REa and a second protrusion part REb.

The first body part TEa may extend in a horizontal or first direction, and the second body part REa may extend in a vertical or second direction. In a region where the first body part TEa and the second body part REa intersect each other, the second body part REa may be continuously formed in the vertical direction, but the first body part TEa may discontinuously formed so that two first body parts TEa are spaced apart from each other. But, the two first body parts TEa spaced apart may be electrically connected through a bridge electrode (not shown) to transmit the same signal.

As the unit cell structure X is repeatedly formed in the first body part TEa and the second body part REa, as illustrated in FIG. 2, the first body part TEa may extend from the left end to the right end of the display panel 100 in the same row, and the second body part REa may extend from the top end to the bottom end of the display panel 100 in the same column.

The first extension part TEb may be formed on one side of the first body part TEa, for example, the left side and the other side, and for example, the right side, and may extend in a vertical direction.

According to an embodiment of the present disclosure, the touch dummy electrode TDE may be provided at one end of the first extension part TEb. Therefore, even if the unit cell structure X is repeatedly formed, the first extension part TEb may not be continuously extended in the vertical direction on the display panel 100 and a plurality of the first extension parts TEb may be spaced apart from each other with the touch dummy electrode TDE therebetween. For example, a first TDE 300 is spaced from a second TDE 302 in a central area of the unit cell structure X. The first TDE 300 extends along the vertical or second direction toward the second TDE 302. By being formed in this way, the plurality of first touch electrodes TE provided in different rows may not be connected to each other and may receive different signals.

The first protrusion TEc may protrude from the first extension part TEb, and the second protrusion REb may protrude from the second body part REa. A plurality of first protrusions TEc and second protrusions REb may be formed, and the second protrusion REb may be provided between the plurality of first protrusions TEc, and the first protrusion TEc may be provided between the plurality of second protrusions REb.

The touch dummy electrode TDE may be provided in a region where the first touch electrode TE or the second touch electrode RE does not need to be formed. For example, the touch dummy electrode TDE may be surrounded in the first protrusion TEc or the second protrusion REb, and may be surrounded in the first extension TEb.

The touch dummy electrode TDE may be formed in a floating structure and may not electrically have any connection relationship.

According to an embodiment of present disclosure, by forming the touch dummy electrode TDE, the reflectance of the region where the first touch electrode TE and the second touch electrode RE are not formed is equal to the reflectance of the region where the first touch electrode TE and the second touch electrode RE are formed, thereby improving the level of the visibility. In addition, by forming the touch dummy electrode TDE, the parasitic capacity of the display device with the integrated touch screen according to an embodiment of the present disclosure may be reduced.

According to an embodiment of the present disclosure, the first touch electrode TE and the second touch electrode RE may be spaced apart from each other to form a boundary area. In this case, a boundary area between the first touch electrode TE and the second protrusion REb of the second touch electrode RE may be formed in the horizontal or vertical direction, and a boundary area between the first body part TEa of the first touch electrode TE and the second body part REa of the second touch electrode RE may be formed in a diagonal direction.

According to an embodiment of the present disclosure, an A region indicated by a dotted line may be formed at a boundary region between the first body part TEa and the second protrusion part REb, and a region B indicated by a dotted line may be formed at an area where the first body part TEa and the second body part REa intersect.

According to an embodiment of the present disclosure, the level of visibility of the display device with the integrated touch screen may be improved by adjusting the positions of the open part OP in FIG. 4 formed by the first touch electrode TE and the second touch electrode RE, and detailed descriptions thereof will be described below with reference to FIGS. 4 and 5.

Figure 4:
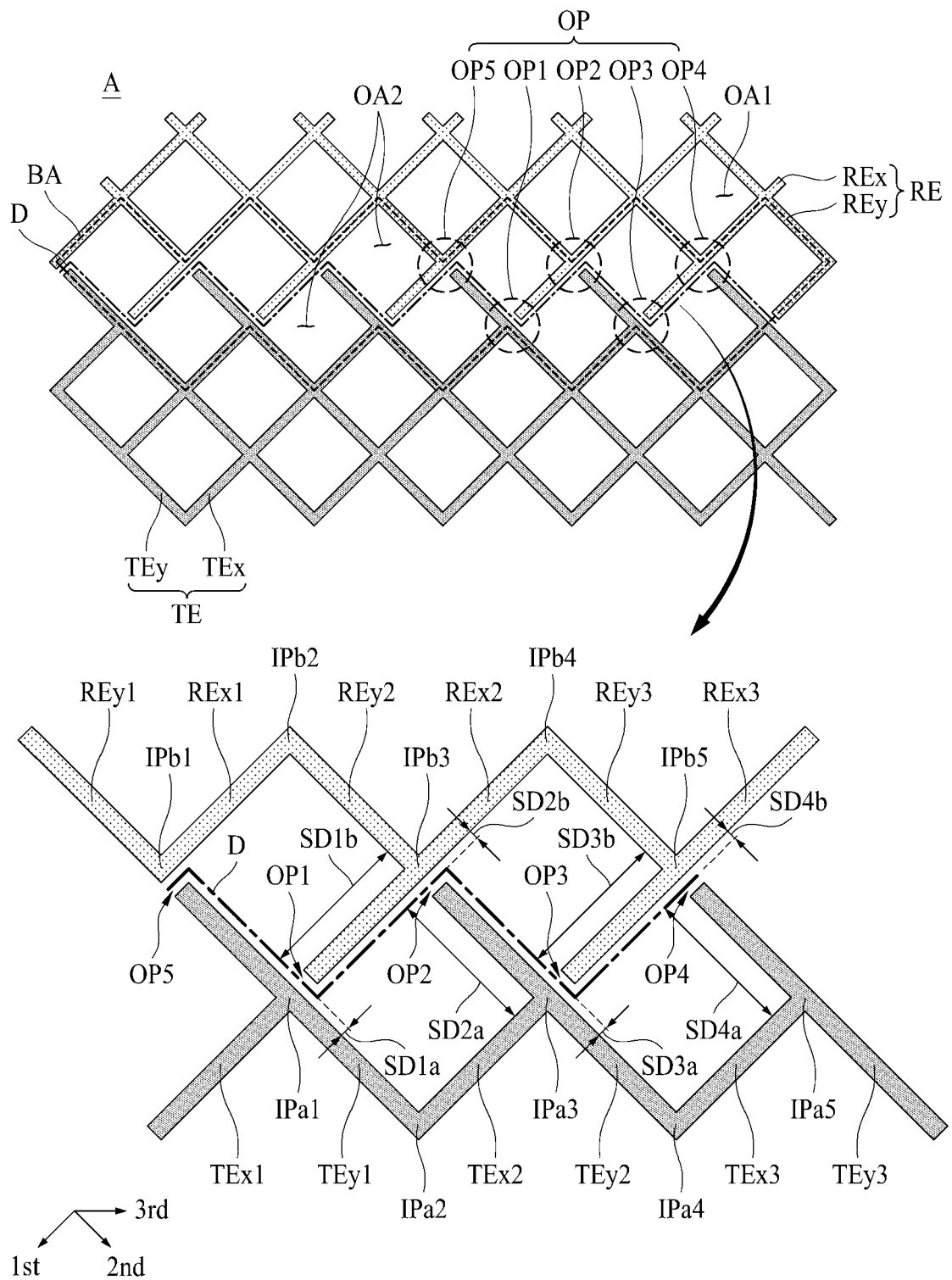
FIG. 4 is a plan view of a touch electrode according to an embodiment of the present disclosure. In this case.

FIG. 4 is a plan view of a touch electrode according to an embodiment of the present disclosure. In this case, FIG. 4 is an enlarged view of an area A of FIG. 3. The plan view of the touch electrode according to FIG. 4 corresponds to a view showing area A of FIG. 3.

According to an embodiment of the present disclosure, as shown in FIG. 4, the first touch electrode TE and the second touch electrode RE may have a mesh type structure.

Specifically, the first touch electrode TE may include a plurality of first sub-touch electrodes TEx extending in a first direction, for example, from lower-left location to upper-right location, and a plurality of second sub-touch electrodes TEy extending in a second direction, for example, from upper-left location to lower-right location. The first direction is at an angle to the horizontal axis of the Figure. The second direction is transverse to the first direction of this Figure. In one embodiment, the first and second directions are transverse to each other, but this is not required in all embodiments.

In addition, the second touch electrode RE may include a plurality of third sub-touch electrodes REx extending in the first direction and a plurality of fourth sub-touch electrodes REy extending in the second direction.

According to an embodiment of present disclosure, since the plurality of first sub-touch electrodes TEx are not connected to the plurality of third sub-touch electrodes REx, and the plurality of second sub-touch electrodes TEy are not connected to the plurality of fourth sub-touch electrodes REy, the first touch electrode TE and the second touch electrode RE may not be electrically connected to each other. Meanwhile, in FIG. 4, the first touch electrode TE may be provided under the second touch electrode RE, the first touch electrode TE may be provided over the second touch electrode RE, or the first touch electrode TE may be provided on the left or right side on the second touch electrode RE.

According to an embodiment of the present disclosure, the first touch electrode TE and the second touch electrode RE may be provided with a plurality of first open areas OA1, and a boundary region BA may be provided in a region where the end of the first touch electrode TE faces the end of the second touch electrode RE. In this case, a plurality of second open areas OA2 may be provided in the boundary area BA by a portion of the first touch electrode TE and a portion of the second touch electrode RE.

The plurality of first open areas OA1 may be provided in the first touch electrode TE and the second touch electrode RE. Specifically, the plurality of first open areas OA1 provided in the first touch electrode TE may be formed in a closed square by crossing the plurality of first sub-touch electrodes TEx and the plurality of second sub-touch electrodes TEy. Similarly, the plurality of first open areas OA1 provided in the second touch electrode RE may be formed in a closed square by crossing the plurality of third sub-touch electrode REx and the plurality of fourth sub-touch electrodes REy.

According to an embodiment of present disclosure, since the first touch electrode TE and the second touch electrode RE have the plurality of first open areas OA1, although not shown in the drawing, light emitted by multiple pixels under the first touch electrode TE and the second touch electrode RE is not blocked, so image information appearing on the display panel 100 can be recognized and coordinate information can be transmitted by the first touch electrode TE, and the second touch electrode RE.

According to an embodiment of the present disclosure, the first touch electrode TE and the second touch electrode RE may not be electrically connected to each other. Accordingly, the boundary area BA that is not connected to each other may be provided between the first touch electrode TE and the second touch electrode RE.

As shown in FIG. 4, the boundary region BA can be positioned between the first touch electrode TE and the second touch electrode RE. In the boundary area BA, the first touch electrode TE and the second touch electrode RE may be spaced apart from each other and may not be electrically connected.

A plurality of second open areas OA2 may be provided in the boundary area BA. Each of the plurality of second open areas OA2 may be formed in a rectangular shape by a portion of the first touch electrode TE and a portion of the second touch electrode RE, while being not closed. The open areas OA2 may have a square or parallelogram shape in some embodiments. The open areas OA2 are bounded or otherwise formed with two sides from extensions of the first touch electrode TE or with two sides from extensions of the second touch electrode RE.

According to an embodiment of present disclosure, any one of the plurality of second open areas OA2 may be formed by crossing two adjacent second sub-touch electrodes TEy of the plurality of second sub-touch electrodes TEy, any one of the plurality of the third sub-touch electrodes REx adjacent to the two second sub-touch electrodes TEy, and any one of the plurality of the first sub-touch electrodes TEx closest to the one third sub-touch electrodes REx in the second direction. Or, any one of the plurality of second open areas OA2 may be formed by crossing two adjacent third sub-touch electrode REx of the plurality of the third sub-touch electrodes REx, any one of the plurality of the second sub-touch electrodes TEy adjacent to the two third sub-touch electrodes REx, and any one of the plurality of the fourth sub-touch electrode REy closest to the one second sub-touch electrode TEy in the first direction.

According to an embodiment of the present disclosure, the plurality of second open areas OA2 may include a plurality of open parts OP (OP1, OP2, OP3, OP4, . . . ). Adjacent two second open areas OA2 may share at least one open parts OP (OP1, OP2, OP3, OP4, . . . ). The plurality of open parts OP may be provided between the plurality of first sub-touch electrodes TEx and the plurality of third sub-touch electrodes REx, or between the plurality of second sub-touch electrodes TEy and the plurality of fourth sub-touch electrodes REy.

Since the plurality of open parts OP may be provided between the plurality of first sub-touch electrodes TEx and the plurality of third sub-touch electrodes REx, and between the plurality of second sub-touch electrodes TEy and the plurality of fourth sub-touch electrodes REy, the plurality of open parts OP may be aligned in diagonal directions (from lower-left location to upper-right location or from upper-left location to lower-right location) in the drawing.

Since the plurality of open parts OP are provided, the first touch electrode TE and the second touch electrode RE according to an embodiment of the present disclosure are not electrically connected to each other, thereby preventing or reducing a short-circuit. The open parts OP may be provided between two adjacent open areas OA2. According to an embodiment of present disclosure, since the virtual line D connecting the plurality of open parts OP is not formed in a straight line, a difference between the reflectance in the boundary area BA and the reflectance of the first touch electrode TE and the second touch electrode RE may be maintained relatively constant, thereby improving the level of the visibility in the boundary area BA. This will be described below through an enlarged view of some of the plurality of second open areas OA2 in FIG. 4.

An enlarged view of FIG. 4 is an enlarged view of four adjacent second open areas OA2 among the plurality of second open areas OA2. In accordance with the embodiment of present disclosure, since the four second open areas OA2 are repeatedly formed, the level of visibility by the plurality of open parts OP may be improved.

The first open part OP1 and the third open part OP3 among the plurality of open parts OP are formed by one end of any one first sub-touch electrode TEx and one end of any one third sub-touch electrode Rex that are spaced apart with each other. Similarly, the second open part OP2 and the fourth open part OP4 among the plurality of open parts OP are formed by one end of any one second sub-touch electrode TEy and one end of any one fourth sub-touch electrode Rey that are spaced apart with each other.

According to an embodiment of the present disclosure, the first open part OP1 may be formed at a left corner part or a lower corner in any one of the plurality of second open areas OA2. The first open part OP1 may be closer to the second sub-touch electrode TEy than the fourth sub-touch electrode Rey. The first open part OP1 may contact the second sub-touch electrode TEy. Specifically, the first open part OP1 may be formed so that the shortest distance SD1$a$ between the first open part OP1 and the second sub-touch electrode TEy is shorter than the shortest distance SD1$b$ between the first open part OP1 and the fourth sub-touch electrode REy. In this case, the shortest distance SD1$a$ between the first open part OP1 and the second sub-touch electrode TEy may be defined as a distance between a center of the first open part OP1 and a first one TEy1 of the second sub-touch electode TEy. A shortest distance SD1$b$ between the first open part OP1 and the fourth sub-touch electrode REy may be defined as a distance between the center of the first open part OP1 and a second one REy2 of the fourth sub-touch electrode REy.

Furthermore, one end of the first sub-touch electrode TEx may be formed to match one side of the second sub-touch electrode TEy.

According to an embodiment of the present disclosure, the second open part OP2 may be formed at an upper corner part on the drawing in any one of the plurality of second open areas OA2. The second open part OP2 may be closer to the third sub-touch electrode REx than the first sub-touch electrode TEx. The second open part OP2 may contact the third sub-touch electrode REx. Specifically, the second open part OP2 may be formed so that the shortest distance SD2$b$ between the second open part OP2 and the third sub-touch electrode REx is shorter than the shortest distance SD2$a$ between the second open part OP2 and the first sub-touch electrode TEx. In this case, the shortest distance SD2$b$ between the second open part OP2 and the third sub-touch electrode REx may be defined as a distance between a center of the second open part OP2 and a second one REx2 of the third sub-touch electrode RE and the shortest distance SD2$a$ between the second open part OP2 and the first sub-touch electrode TEx may be defined as a distance between the center of the second open part OP2 and a second one TEx2 of the first sub-touch electrode TEx.

Furthermore, one end of the fourth sub-touch electrode REy may be formed to match one side of the third sub-touch electrode REx.

According to an embodiment of the present disclosure, the third open part OP3 may be formed to be similar to the first open part OP1, and the fourth open part OP4 may be formed to be similar to the second open part OP2. Accordingly, a virtual straight line connecting the first open part OP1 with the second open part OP2 may be parallel to a virtual straight line connecting the third open part OP3 with the fourth open part OP4.

The virtual line connecting the first open part OP1 with the third open part OP3 may overlap any one of the plurality of second sub-touch electrodes TEy, and the virtual line connecting the second open part OP2 with the fourth open part OP4 may overlap any one of the plurality of third sub-touch electrodes REx. Therefore, the first open part OP1 and the third open part OP3 are provided in different second open areas OA2, and the second open part OP2 and the fourth open part OP4 are provided in different second open areas OA2.

Since the virtual straight line connecting the first open part OP1 with the second open part OP2 and the virtual straight line connecting the third open part OP3 with the fourth open part OP4 are formed in parallel, the display device with the integrated touch screen according to an embodiment of present disclosure may have improved level of the visibility in the boundary area BA.

If the virtual straight line connecting from the first open part OP1 to the fourth open part OP4 forms a straight line, the straight line connecting from the first open parts OP1 to the fourth open parts OP4 may be visually recognized according to a difference in reflectivity between the area where the touch electrodes TE and RE are formed and the area where the first open parts OP1 to the fourth open parts OP4 are formed.

Alternatively, FIG. 4 can be described as the first touch electrode TE having a plurality of first extensions TEx1, TEx2 and TEx3 in a first direction and a plurality of second extensions TEy1, TEy2 and TEy3 in a second direction that is transverse to the first direction, and the second touch electrode RE having a plurality of third extensions REx1, REx2 and REx3 in the first direction and a plurality of fourth extensions REy1, REy2 and REy3 in the second direction. The plurality of first extensions TEx1, TEx2 and TEx3 may be substantially parallel to the plurality of third extensions REx1, REx2 and REx3.

The first and second extensions may be coupled together at first (TE) intersection points IPa1, IPa2, IPa3, IPa4 and IPa5. And the third and fourth extensions may be coupled together at second (RE) intersection points IPb1, IPb2, IPb3, IPb4 and IPb5. At intersection areas of the first touch electrode TE and the second touch electrode RE, there are plurality of open parts or openings OP (OP1, OP2, etc.), which electrically isolate the first and second touch electrodes from each other.

The plurality of first extensions TEx includes a first one TEx1 of the first extensions that extends in a left lower direction from a first one TEy1 of the second extensions TEy. A second one TEx2 of the first extensions TEx extends in a right upper direction from the first one TEy1 of the second extensions TEy. A second one TEy2 of the second extensions extends in a direction from a left upper location to a right lower location at the second one TEx2 of the first extensions.

The plurality of third extensions REx includes a first one REx1 of the third extensions that extends in a right upper direction from a first one REy1 of the fourth extensions REy. A second one REx2 of the third extensions extends in a direction from a left lower location to a right upper location at a second one REy2 of the fourth extensions.

A first open part OP1 isolates the second one REx2 of the third extensions from the first one TEy1 of the second extensions. The first open part OP1 is adjacent to a first one of the first intersection point IPa1. A second open part OP2 isolates the second one REx2 of the third extensions from the second one TEy2 of the second extensions.

A third open part OP3 is between the second one TEy2 of the second extensions and a third one REx3 of the third extensions. A fourth open part OP4 is between the third one REx3 of the third extensions and a third one TEy3 of the second extensions.

The first one REx1 of the plurality of third extensions REx may be spaced from the first one TEy1 of the plurality of second extensions TEy by a fifth open part OP5 of the plurality of the open parts OP. The second one REx2 of the plurality of third extensions REx may be spaced from the first one TEy1 of the plurality of second extensions TEy by the first open part OP1.

The first open part OP1 is between the fifth open part OP5 and a second one of the first intersection point IPa2. The second one TEy2 of the plurality of second extensions TEy may be spaced apart from a third one of the second intersection point IPb3 by the second open part OP2. The fifth open part OP5 and the second open part OP2 are aligned along a third direction that is different from the first direction and different from the second direction. The third direction is at a variety of angles that are transverse to both the first direction and the second direction. The third direction is not perpendicular to the first direction and is not perpendicular to the second direction. The third open part OP3 is between a third one of the first intersection point IPa3 and the third one REx3 of the plurality of third extensions REx. The second one TEx2 of the plurality of first extensions TEx is spaced from the third one REx3 of the plurality of third extensions REx by the third open part OP3. The first open part OP1 and the third open part OP3 are aligned with each other along the third direction.

Figure 5:
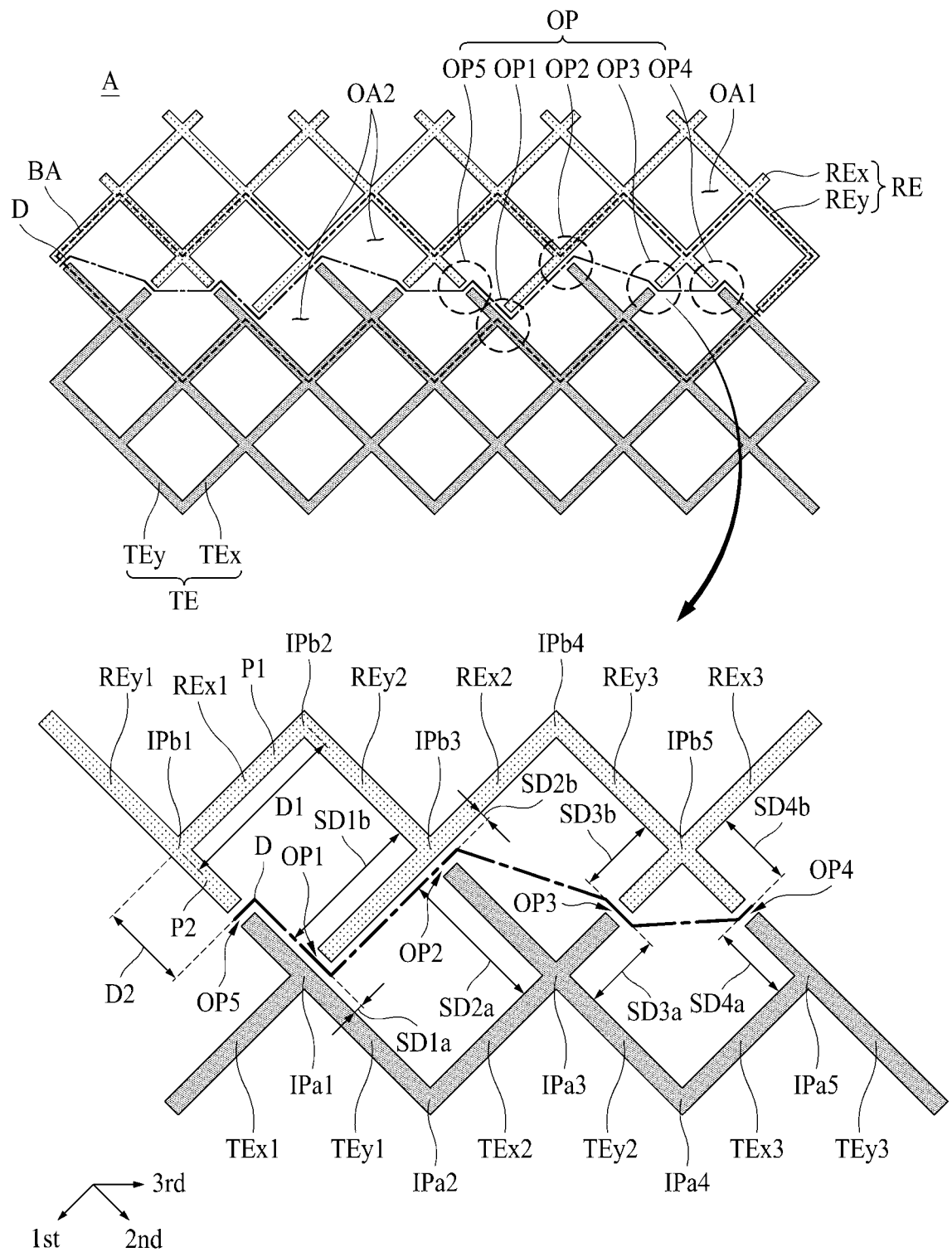
FIG. 5 is a plan view of a touch electrode according to another embodiment of the present disclosure. In this case.

FIG. 5 is a plan view of a touch electrode according to another embodiment of the present disclosure. In this case, FIG. 5 is an enlarged view of an area A of FIG. 3. Meanwhile, the embodiment according to FIG. 5 is the same except for the positions where the third open part OP3, the fourth open part OP4 and the fifth open part OP5 are formed as in the embodiment of FIG. 4, and thus different configurations will be mainly described below.

An enlarged view of FIG. 5 is an enlarged view of four adjacent second open areas OA2 among the plurality of second open areas OA2. In accordance with the embodiment of present disclosure, since the four second open areas OA2 are repeatedly formed, the level of visibility by the plurality of open parts OP may be improved.

Among the plurality of open parts OP, the first open part OP1 and the second open part OP2 can be formed in the same way as in the embodiment in FIG. 4. Therefore, according to the embodiment of FIG. 5, the first open part OP1 may be formed so that the shortest distance between the first open part OP1 and the second sub-touch electrode TEy is shorter than the shortest distance between the first open part OP1 and the fourth sub-touch electrode REy, and the second open part OP2 may be formed so that the shortest distance between the second open part OP2 and the third sub-touch electrode REx is shorter than the shortest distance between the second open part OP2 and the first sub-touch electrode TEx.

According to an embodiment of the present disclosure, the third open part OP3 may be formed at a different position from the first open part OP1, and the fourth open part OP4 may be formed at a different position from the second open part OP2.

According to another embodiment of the present disclosure, as shown in the enlarged view of FIG. 5, the third open part OP3 may be formed between one end of the first sub-touch electrode TEx and one end of the third sub-touch electrode REx that are spaced apart from each other.

In this case, the shortest distance SD3a between the third open part OP3 and the plurality of second sub-touch electrodes TEy may be the same as the shortest distance SD3b between the third open part OP3 and the plurality of fourth sub-touch electrodes REy. In this case, the shortest distance SD3a between the third open part OP3 and the plurality of the second sub-touch electrode TEy may be defined as a distance between a center of the third open part OP3 and a second one TEy2 of the second sub-touch electrode TEy, and the shortest distance SD3b between the third open part OP3 and the plurality of the fourth sub-touch electrode REy may be defined as a distance between the center of the third open part OP3 and a third one REy3 of the fourth sub-touch electrode REy.

Similarly, the fourth open part OP4 can be formed between one end of the fourth sub-touch electrode REy and one end of the second sub-touch electrode TEy that are spaced apart from each other.

In this case, the shortest distance SD4b between the fourth open part OP4 and the plurality of third sub-touch electrodes REx may be the same as the shortest distance SD4a between the fourth open part OP4 and the plurality of first sub-touch electrodes TEx. In this case, the shortest distance SD4a between the fourth open part OP4 and the plurality of the first sub-touch electrode TEx may be defined as a distance between a center of the fourth open part OP4 and a third one TEx3 of the first sub-touch electrode TEx, and the shortest distance SD4b between the fourth open part OP4 and the plurality of the third sub-touch electrode REx may be defined as a distance between the center of the fourth open part OP4 and a third one REx3 of the third sub-touch electrode REx.

Therefore, a virtual straight line connecting the first open part OP1 with the second open part OP2 and a virtual straight line connecting the third open part OP3 with the fourth open part OP4 may meet at one point without being parallel to each other.

Since the virtual straight line connecting the first open part OP1 with the second open part OP2 and the virtual straight line connecting the third open part OP3 with the fourth open part OP4 are not in a straight line, the display device with the integrated touch screen according to an embodiment of present disclosure may have an improved level of the visibility in the boundary area BA.

In this embodiment, the first touch electrode TE may be described including a plurality of interconnected rectangular mesh first electrodes having a plurality of corners or the first intersection points IPa1, IPa2, IPa3, IPa4 and IPa5. The second touch electrode RE may be described as including a plurality of interconnected rectangular mesh second electrodes having a plurality of corners or the second intersection points IPb1, IPb2, IPb3, IPb4 and IPb5.

A first open part OP1 is adjacent to a first one of the first intersection point IPa1 of the first electrode. A first one of the second intersection point IPb1 of the second electrode is aligned with the first one of the first intersection point IPa1 of the first electrode along the second direction. A second one of the second intersection point IPb2 of the second electrode is aligned with the first one of the second intersection point IPb1 of the second electrode along the first direction. A second open part OP2 is adjacent to and aligned with a third one of the second intersection point IPb3 of the second electrode.

A fifth open part OP5 is between the first intersection point IPb1 of the second touch electrode RE and the first one of the first intersection point IPa1 of the first touch electrode TE. A second one of the first intersection point IPa2 of the first electrode is aligned with the first one of the second intersection point IPb1 of the second electrode along the second direction. A first portion P1 of REx1 of the second electrode RE has a first dimension d1 between the first one of the second intersection point IPb1 and the second one of the second intersection point IPb2 of the second electrode RE. A second portion P2 of REy1 of the second electrode RE may have a second dimension d2 between the first one of the second intersection point IPb1 and a fifth open part OP5. The second dimension d2 is less than the first dimension d1. The fifth open part OP5 is spaced from the first one of the second intersection point IPb1 by the second dimension d2. The second open part OP2 is adjacent to a third one of the second intersection point IPb3. There is no extension from the third one of the second intersection point IPb3 of the second electrode RE at the second open part OP2.

The third open part OP3 is at an intermediate location between a fifth one of the second intersection point IPb5 of the second electrode RE and a third one of the first intersection point IPa3 of the first electrode TE. The third open part OP3 is spaced from both the fifth one of the second intersection point IPb5 and the third one of the first intersection point IPa3. The plurality of open part OP are in arranged with respect to each other in a non-linear configuration. Adjacent open parts are arranged at different distances from intersection points. A closest open part to a particular respective part may be spaced from the closest intersection point by different distances.

Within the plurality of open part OP, there is at least one open part that is adjacent to one of the second intersection points of the second electrode RE and there is at least one open part that is at intermediate location between a second intersection point of the second electrode RE and a first intersection point of the first electrode TE. The intermediate location is spaced from each of the respective intersection points by a distance that is less than the distance between the respective intersection points.

Said differently, the plurality of open part OP may include a first open part at a first location between the first electrode TE and the second electrode RE. The plurality of open part OP may include a second open part at a second location between the first electrode TE and the second electrode RE. The first location may be at a different position between respective intersection points of the first and second electrodes TE and RE than the second location between respective intersection points of the first and second electrodes TE and RE.

Figure 6:
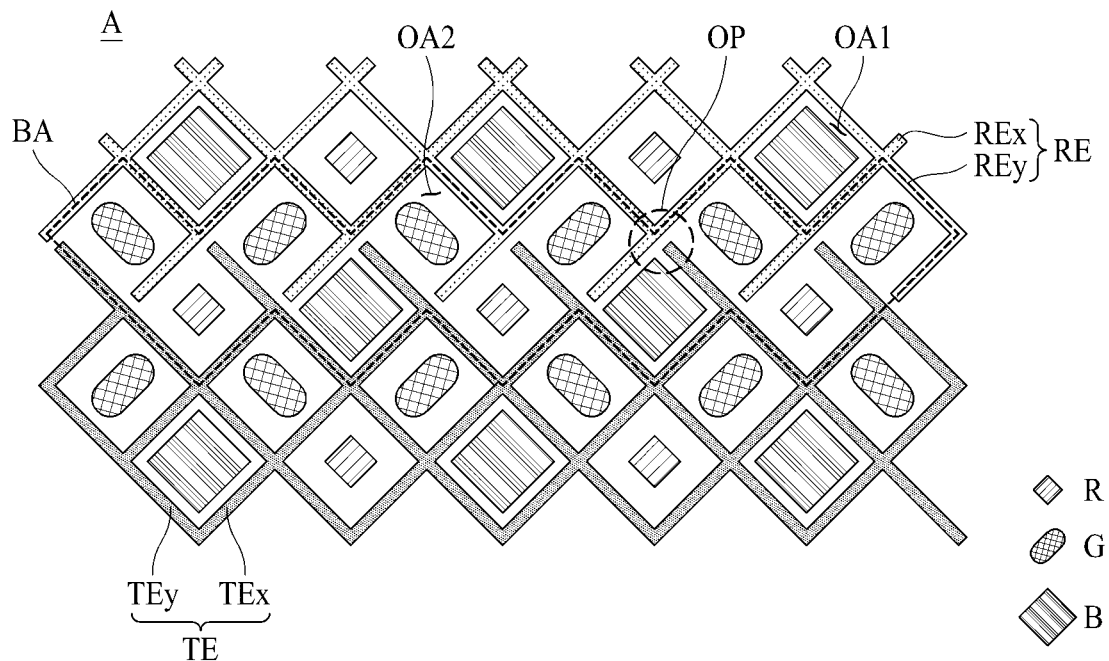
FIG. 6 is a plan view of a touch electrode and a pixel according to an embodiment of the present disclosure. In this case.

FIG. 6 is a plan view of a touch electrode and a pixel according to an embodiment of the present disclosure. In this case, FIG. 6 is an enlarged view of an area A of FIG. 3. Meanwhile, the embodiment according to FIG. 6 is the same except that pixels R, G, and B correspond to the first open area OA1 and the second open area OA2 of FIG. 4, so different configurations will be mainly described below.

According to an embodiment of the present disclosure, the pixels R, G, and B may include a blue pixel B that emits blue light, a green pixel G that emits green light, and a red pixel R that emits red light. In this case, the plurality of pixels may be repeatedly provided on the display panel 100 as one unit of one red pixel R, one blue pixel B, and two green pixels G. However, the present disclosure is not limited thereto.

According to an embodiment of the present disclosure, as shown in FIG. 6, any one of the plurality of pixels R, G, and B is formed to correspond to any one of the plurality of first open areas OA1 and the plurality of second open areas OA2. By forming in this way, when each of the pixels R, G, and B emits light, a virtual line D in FIG. 4 connecting the plurality of open parts OP is not formed in a straight line, so that the level of visibility of the display device with the integrated touch screen according to an embodiment of present disclosure can be improved.

Figure 7:
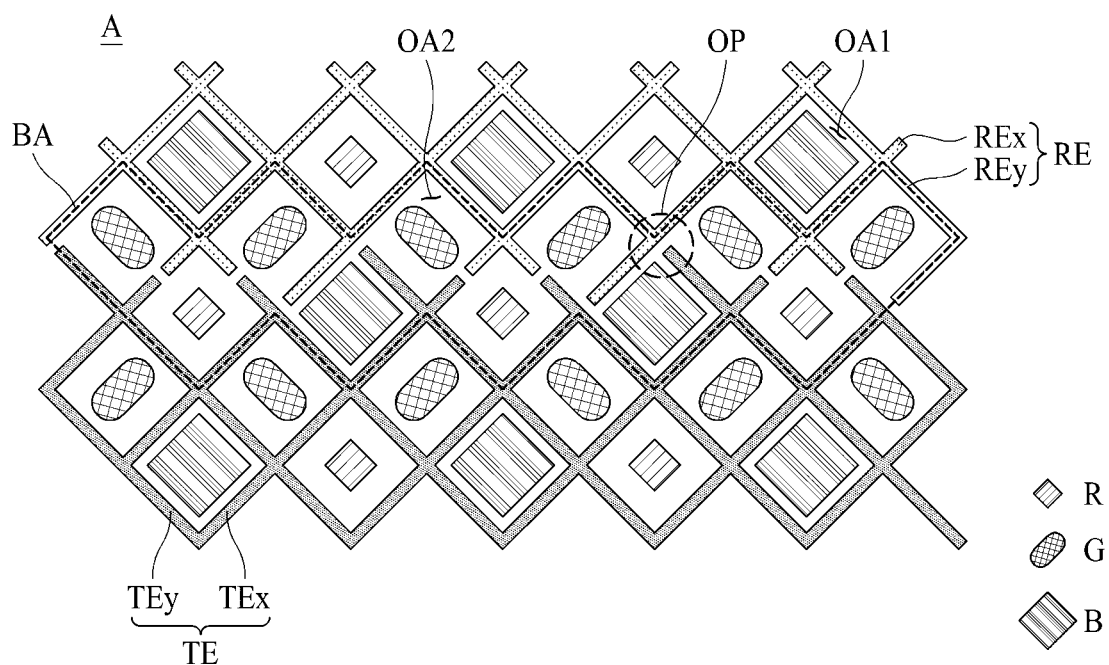
FIG. 7 is a plan view of a touch electrode and a pixel according to another embodiment of the present disclosure. In this case.

FIG. 7 is a plan view of a touch electrode and a pixel according to another embodiment of the present disclosure. In this case, FIG. 7 is an enlarged view of an area A of FIG. 3. Meanwhile, the embodiment according to FIG. 7 is the same except that pixels R, G, and B correspond to the first open area OA1 and the second open area OA2 of FIG. 5, and thus different configurations will be mainly described below.

According to another embodiment of the present disclosure, as shown in FIG. 7, any one of the plurality of pixels R, G, and B is formed to correspond to any one of the plurality of first open areas OA1 and the plurality of second open areas OA2.

According to another embodiment of present disclosure, the red pixel R, the green pixel G, and the blue pixel B corresponding to the second area OA2 may have different positions of the open part OP provided in the second open area OA2 for each pixel. By forming in this way, when each of the pixels R, G, and B emits light, a virtual line D in FIG. 5 connecting the plurality of open parts OP is not formed in a straight line, so that the level of visibility of the display device with the integrated touch screen according to an embodiment of present disclosure can be improved.

According to another embodiment of the present disclosure, any one of the plurality of second open areas OA2 may correspond to the blue pixel B. In this case, the second open area OA2 may include the first open part OP1 and the second open part OP2. Accordingly, the first open part OP1 and the second open part OP2 are provided at positions adjacent to the blue pixel B.

The shortest distance between one end of the first open part OP1 provided in the second open area OA2 and the plurality of second sub-touch electrodes TEy may be shorter than the shortest distance between the other end of the first open part OP1 and the plurality of fourth sub-touch electrodes REy, and the shortest distance between one end of the second open part OP2 provided in the second open area OA2 and the plurality of third sub-touch electrode REx may be shorter than the shortest distance between the other end of the second open part OP2 and the plurality of the first sub-touch electrode TEx.

According to an embodiment of the present disclosure, another one of the plurality of second open areas OA2 may correspond to the green pixel G. In this case, the second open area OA2 may include the second open part OP2 and the third open part OP3. Accordingly, the second open part OP2 and the third open part OP3 are provided at positions adjacent to the green pixel G.

The shortest distance between one end of the third open part OP3 provided in the second open area OA2 and the plurality of second sub-touch electrodes TEy may be equal to the shortest distance between the other end of the third open part OP3 and the plurality of fourth sub-touch electrodes REy.

Furthermore, according to an embodiment of the present disclosure, another one of the plurality of second open areas OA2 may correspond to the red pixel R. In this case, the another one of the plurality of the second open areas OA2 may include the third open part OP3 and the fourth open part OP4. Accordingly, the third open part OP3 and the fourth open part OP4 are provided at positions adjacent to the red pixel R.

The shortest distance between one end of the fourth open part OP4 provided in the second open area OA2 and the plurality of third sub-touch electrodes REx may be equal to the shortest distance between the other end of the fourth open part OP4 and the plurality of first sub-touch electrodes TEx.

As a result, the blue pixel B having the largest emission intensity corresponds to the plurality of second open areas OA2 including the first open part OP1 and the second open part OP2, thereby improving the level of the visibility of the display device with the integrated touch screen according to the embodiment of present disclosure.

Figure 8:
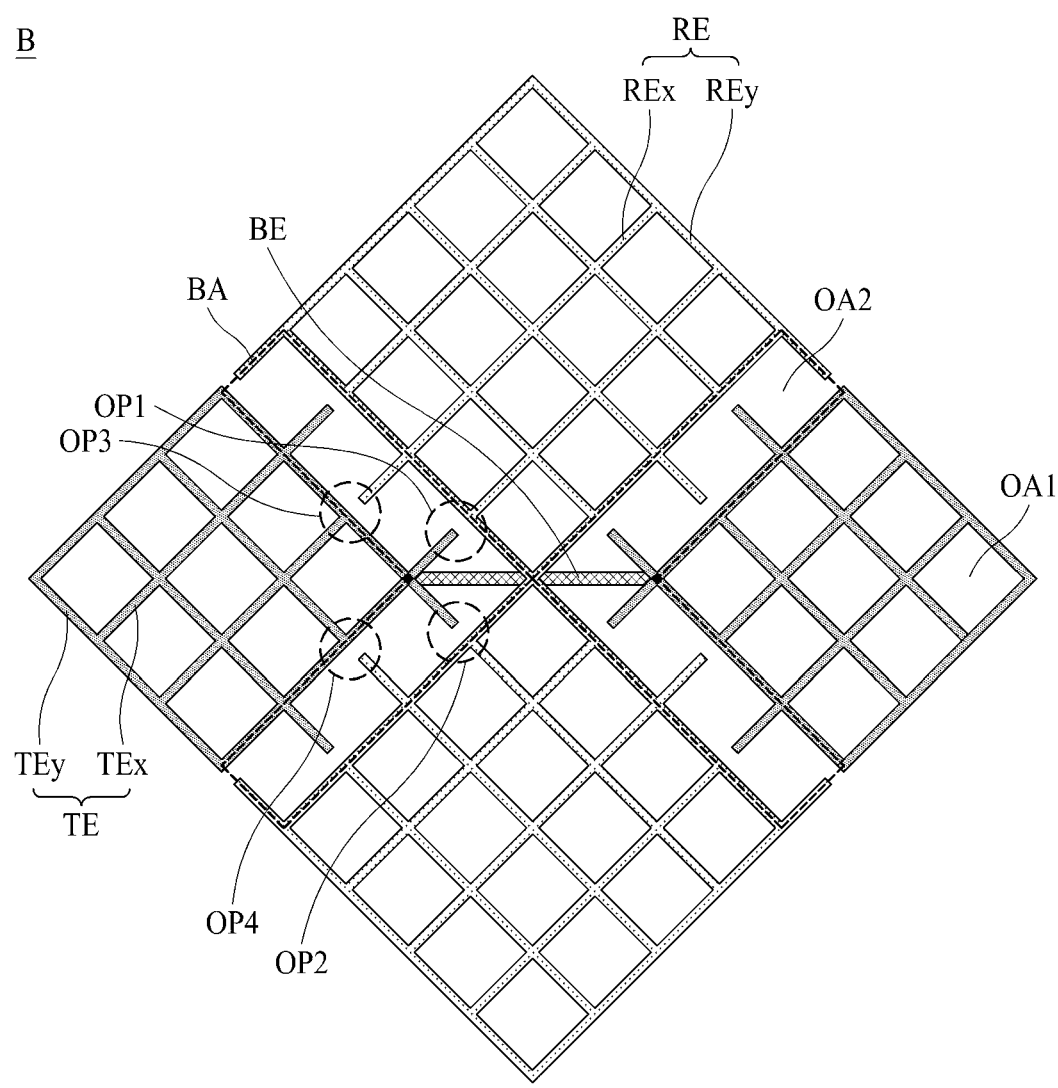
FIG. 8 is a plan view of a touch electrode according to an embodiment of the present disclosure. In this case.

FIG. 8 is a plan view of a touch electrode according to an embodiment of the present disclosure. In this case, FIG. 8 is an enlarged view of a region B of FIG. 3. The plan view of the touch electrode according to FIG. 8 corresponds to a view showing region B of FIG. 3.

According to an embodiment of the present disclosure, as shown in FIG. 8, the region B includes the first touch electrode TE, the second touch electrode RE, the bridge electrode BE, and a boundary area BA formed between the first touch electrode TE and the second touch electrode RE.

According to an embodiment of the present disclosure, the region B may be formed in the form of a rhombus as a whole. In this case, the second touch electrode RE may be provided in the upper and lower areas of the region B on the drawing, and the first touch electrode TE may be provided in the left and right areas of the region B on the drawing. The rhombus shape may also be referred to as a parallelogram.

The first touch electrode TE and the second touch electrode RE may have a mesh type structure. The first touch electrode TE includes the first sub-touch electrode TEx extending in the first direction and the second sub-touch electrode TEy extending in the second direction, and the second touch electrode RE includes the third sub-touch electrode REx extending in the first direction and the fourth sub-touch electrode REy extending in the second direction. The second direction being transverse to the first direction in one embodiment.

The first touch electrode TE may extend in a horizontal direction, for example, and the second touch electrode RE may extend in a vertical direction, for example. In this case, to prevent the first touch electrode TE and the second touch electrode RE from being short-circuited, the first touch electrode TE is formed separately and electrically connected to each other by a bridge electrode BE provided between the first touch electrodes TE.

Accordingly, the first touch electrode TE may have the same signal input in the horizontal direction by the bridge electrode BE, and the second touch electrode RE may extend in the vertical direction without being spaced apart from a region where the bridge electrode BE is formed.

However, the present disclosure is not limited thereto, and the first touch electrode TE may extend and the second touch electrode RE may be spaced apart from each other such that the second touch electrodes RE may be electrically connected by the bridge electrode BE.

According to an embodiment of the present disclosure, the first touch electrode TE and the second touch electrode RE may be provided with a plurality of first open areas OA1, and a boundary region BA may be provided in a region where the end of the first touch electrode TE meets the end of the second touch electrode RE. In this case, a plurality of second open areas OA2 may be provided in the boundary area BA by a portion of the first touch electrode TE and a portion of the second touch electrode RE. The boundary area BA is an area where the first touch electrode TE and the second touch electrode RE are electrically separated by the plurality of openings OP. Specifically, the plurality of first open areas OA1 provided in the first touch electrode TE may be formed in a closed square or parallelogram by crossing the plurality of first sub-touch electrodes TEx and the plurality of second sub-touch electrodes TEy. Similarly, the plurality of first open areas OA1 provided in the second touch electrode RE may be formed in a closed square by crossing the plurality of third sub-touch electrode REx and the plurality of fourth sub-touch electrodes REy.

According to an embodiment of present disclosure, the boundary region BA can be provided in a region where the end of the first touch electrode TE and the end of the second touch electrode RE meet. Meanwhile, unlike the boundary area BA according to FIG. 4 extending in the horizontal direction, the boundary area BA according to FIG. 8 may be provided to extend in the first direction, for example, right-down direction and then in the second direction, for example, left-down direction, or to extend in the second direction, for example left-down direction, and then in the first direction, for example, right-down direction.

The plurality of second open areas OA2 may be provided in the boundary area BA. Each of the plurality of second open areas OA2 may be formed in a non-closed rectangular shape formed by crossing a portion of the first touch electrode TE and a portion of the second touch electrode RE.

According to an embodiment of present disclosure, any one of the plurality of second open areas OA2 may be formed by crossing any one of the plurality of first sub-touch electrodes TEx, any one of the plurality of second sub-touch electrodes TEy, any one of the plurality of third sub-touch electrodes REx, and any one of the plurality of fourth sub-touch electrodes REy.

According to an embodiment of the present disclosure, the plurality of second open areas OA2 may include a plurality of open parts OP (OP1, OP2, OP3, OP4, . . . ). The plurality of open parts OP may be provided between the plurality of first sub-touch electrodes TEx and the plurality of third sub-touch electrodes REx, or between the plurality of second sub-touch electrodes TEy and the plurality of fourth sub-touch electrodes REy.

Since the plurality of open parts OP are provided, the first touch electrode TE and the second touch electrode RE according to an embodiment of the present disclosure are not electrically connected to each other, thereby preventing a short circuit.

The plurality of first open parts OP1 and the plurality of third open parts OP3 are formed by spaced apart one end of any one first sub-touch electrode among the plurality of first sub-touch electrodes TEx and one end of any one third sub-touch electrode among the plurality of third sub-touch electrodes REx.

According to an embodiment of the present disclosure, any one of the plurality of second open areas OA2 may include the first open part OP1 and the third open part OP3.

The first open part OP1 may be provided so that the shortest distance between one end of the first open part OP1 and the plurality of fourth sub-touch electrodes REy may be shorter than the shortest distance between the other end of the first open part OP1 and the plurality of second sub-touch electrodes TEy, and the shortest distance between one end of the third open part OP3 and the plurality of second sub-touch electrode TEy may be shorter than the shortest distance between the other end of the third open part OP3 and the plurality of fourth sub-touch electrode REy.

As the first open part OP1 and the third open part OP3 are formed as described above, the first open part OP1 may be formed on one side of the second open area OA2, for example, on the right side in the drawing, and the third open part OP3 may be formed on the other side of the second open area OA2, for example, on the left side in the drawing, and the first open part OP1 and the third open part OP3 may be provided in a direction diagonal to each other in the second open area OA2. Furthermore, a virtual line segment connecting the first open part OP1 with the third open part OP3 may not overlap the plurality of first sub-touch electrodes TEx to the plurality of fourth sub-touch electrodes REy.

According to an embodiment of the present disclosure, since a virtual line connecting the plurality of first open parts OP1 with the plurality of third open parts OP3 is not in a straight line, the level of the visibility of the display device with the integrated touch screen according to the embodiment of the present disclosure may be improved. According to an embodiment of the present disclosure, the plurality of second open parts OP2 and the plurality of fourth open parts OP4 may also be formed similarly to the plurality of first open parts OP1 and the plurality of third open parts OP3.

The plurality of second open parts OP2 and the plurality of fourth open parts OP4 are formed by spaced apart one end of any one second sub-touch electrode among the plurality of second sub-touch electrodes TEy and one end of any one fourth sub-touch electrode among the plurality of fourth sub-touch electrodes REy.

According to an embodiment of the present disclosure, the other second open area OA2 among the plurality of second open areas OA2 may include the second open part OP2 and the fourth open part OP4.

In this case, the second open part OP2 may be provided so that the shortest distance between one end of the second open part OP2 and the plurality of third sub-touch electrodes REx is shorter than the shortest distance between the other end of the second open part OP2 and the plurality of first sub-touch electrodes TEx, and the fourth open part OP4 may be provided so that the shortest distance between one end of the fourth open part OP4 and the plurality of first sub-touch electrode TEx is shorter than the shortest distance between the other end of the fourth open part OP4 and the plurality of third sub-touch electrode REx.

By forming the second open part OP2 and the fourth open part OP4 as described above, the second open part OP2 may be formed on one side of the other second open area OA2, for example, on the right side in the drawing, and the fourth open part OP4 may be formed on the other side of the other second open area OA2, for example, on the left side in the drawing, and the second open part OP2 and the fourth open part OP4 may be provided in a direction diagonal to each other in the other second open area OA2. Furthermore, a virtual line segment connecting the second open part OP2 with the fourth open part OP4 may not overlap the plurality of first sub-touch electrodes TEx to the plurality of fourth sub-touch electrodes REy.

According to an embodiment of present disclosure, since a virtual line connecting the plurality of second open parts OP2 with the plurality of fourth open parts OP4 is not in a straight line, the level of visibility of the display device with the integrated touch screen according to the embodiment of present disclosure may be improved.

According to an embodiment of the present disclosure, another second open area OA2 of the plurality of second open areas OA2 includes the first open part OP1 and the second open part OP2.

The another second open area OA2 may overlap the bridge electrode BE, and a portion of the first touch electrode TE of the another second open area OA2 may be electrically connected to the bridge electrode BE through a contact hole. Said differently, the plurality of open parts OP1, OP2, OP3, OP4 are aligned with adjacent ones of the open parts in a non-linear manner or configuration.

Meanwhile, although not shown in the drawings, the plurality of second open areas OA2 may correspond to the plurality of pixels R, G, and B as shown in FIG. 6 or 7. For example, any one of the plurality of second open areas OA2 may correspond to a blue pixel B of any one of the plurality of pixels R, G, and B. In this case, the blue pixel B may be adjacent to the first open part OP1 and the third open part OP3.

Figure 9:
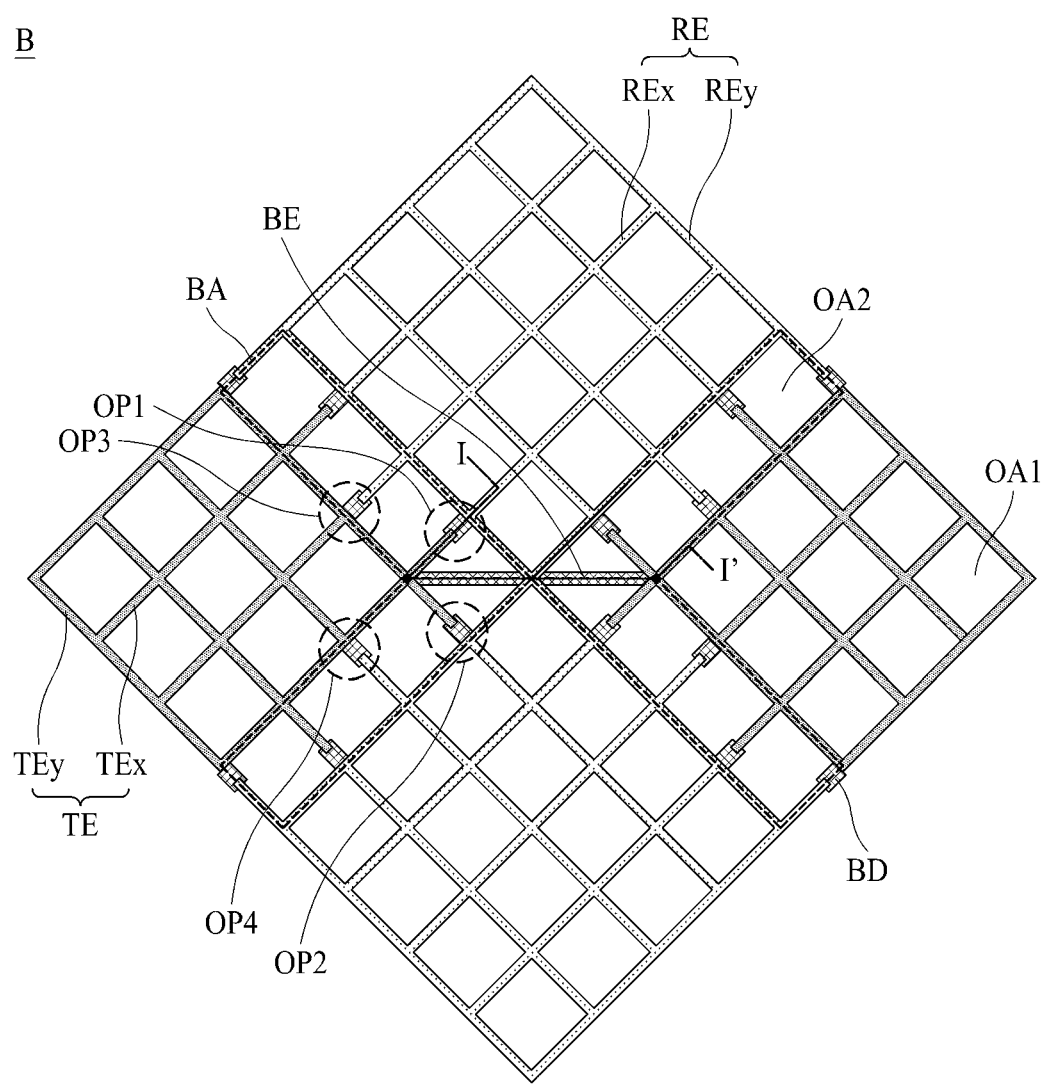
FIG. 9 is a plan view of a touch electrode according to another embodiment of the present disclosure. In this case.

FIG. 9 is a plan view of a touch electrode according to another embodiment of the present disclosure. In this case, FIG. 9 is an enlarged view of a region B of FIG. 3. Meanwhile, since the embodiment of FIG. 9 is the same as the embodiment of FIG. 8, except that the dummy electrode BD is provided in the display device with the integrated touch screen, different configurations will be mainly described below.

A display device with the integrated touch screen according to another embodiment of the present disclosure further includes a plurality of dummy electrodes BD.

As shown in FIG. 9, the plurality of dummy electrodes BD may be provided to at least partially overlap the plurality of open parts OP. Accordingly, the plurality of dummy electrodes BD may overlap the first open part OP1 to the fourth open part OP4.

The plurality of dummy electrodes BD may be formed in a floating structure, where the floating structure means a structure that is not electrically connected with other components. Accordingly, the plurality of dummy electrodes BD is not electrically connected to the first touch electrode TE and the second touch electrode RE. The plurality of dummy electrodes BD may be formed in different layers from the first touch electrode TE, the second touch electrode RE, and the plurality of open parts OP, which will be described in detail with reference to FIGS. 10 to 12.

According to another embodiment of present disclosure, since the display device with the integrated touch screen includes the plurality of dummy electrodes BD, the level of visibility due to the difference in reflectance between the region where the plurality of open parts OP are formed and the region where the first touch electrode TE and the second touch electrode RE are formed can be further improved.

Figure 10:
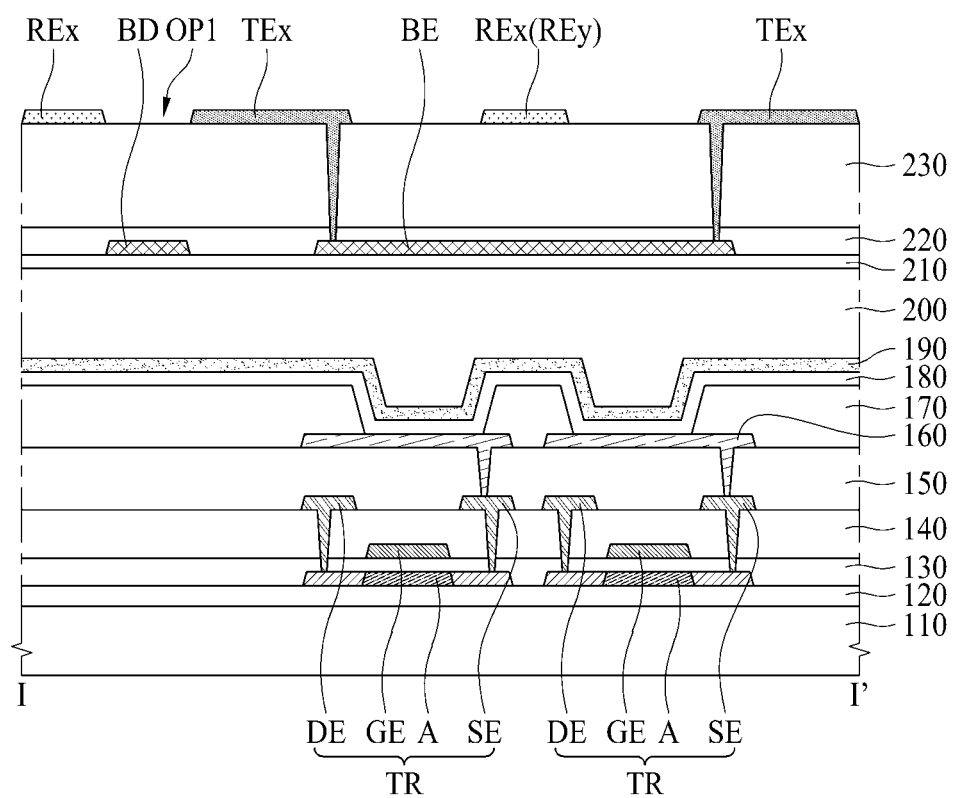
FIG. 10 is a cross-sectional view of a display device with the integrated touch screen according to another embodiment of the present disclosure. In this case, FIG. 10 corresponds to a cross section of line I-I' of FIG. 9.

FIG. 10 is a cross-sectional view of a touch electrode according to another embodiment of the present disclosure. In this case, FIG. 10 corresponds to a cross section of line I-I' of FIG. 9.

As shown in FIG. 10, the display device with the integrated touch screen according to the embodiment of present disclosure includes a substrate 110, a buffer layer 120, a thin film transistor TR, a gate insulating film 130, an interlayer insulating layer 140, a planarization layer 150, a first electrode 160, a bank layer 170, a light emitting layer 180, a second electrode 190, an encapsulation layer 200, a first insulating layer 210, a second insulating layer 220, a third insulating layer 230, a bridge electrode BE, a dummy electrode BD, a first touch electrode TE and a second touch electrode RE.

The substrate 110 may be made of glass or plastic. In particular, the substrate 110 may be made of transparent plastic having flexible properties, for example, polyimide. When polyimide is used as the substrate 110, considering that a high-temperature deposition process is performed on the substrate 110, a heat-resistant polyimide capable of enduring high temperatures may be used.

The buffer layer 120 is formed on the substrate 110. The buffer layer 120 may protect the active layer A by blocking air and moisture. The buffer layer 120 may be formed of an inorganic insulating material such as silicon oxide, silicon nitride, or metal oxide, but is not limited thereto and may be formed of an organic insulating material. The buffer layer 120 may be formed of a single layer or a plurality of layers.

The thin film transistor TR may be formed on the substrate 110 or the buffer layer 120. The thin film transistor TR may include an active layer A, a gate electrode GE, a source electrode SE, and a drain electrode DE, and the thin film transistor TR shown in FIG. 9 may be a driving thin film transistor.

Meanwhile, the thin film transistor TR according to an embodiment of present disclosure illustrates only a top gate structure in which the gate electrode GE is provided above the active layer A, but is not limited thereto, and the thin film transistor TR may have a bottom gate structure in which the gate electrode GE is provided below the active layer A, furthermore a double gate structure in which the gate electrode GE is provided above and below the active layer A.

The active layer A may be formed on the substrate 110 or the buffer layer 120. The active layer A may be formed of a silicon Si based semiconductor material or an oxide-based semiconductor material. A light blocking layer for blocking external light incident on the active layer A may be additionally formed between the buffer layer 120 and the active layer A.

The gate insulating layer 130 may be formed on the active layer A.

The gate insulating layer 130 may include a silicon nitride layer SiNx or a silicon oxide layer SiOx, but is not limited thereto. The gate insulating layer 130 may have a single layer structure or a multilayer layer structure.

The gate electrode GE may be formed on the gate insulating layer 130.

The gate electrode GE may include at least one of an aluminum-based metal such as aluminum Al or an aluminum alloy, a silver-based metal such as silver Ag or silver alloy, a copper-based metal such as copper Cu or copper alloy, a molybdenum-based metal such as molybdenum Mo or molybdenum alloy, chromium Cr, tantalum Ta, neodymium Nd, and titanium Ti. The gate electrode GE may be formed of a single layer or a multilayer film including two or more conductor layers having different physical properties.

The interlayer insulating layer 140 is formed on the gate electrode GE.

The interlayer insulating layer 140 insulates the gate electrode GE from the source electrode SE and further insulates the gate electrode GE from the drain electrode DE. The interlayer insulating layer 140 may include a single layer or a plurality of layers including an inorganic insulating material and/or an organic insulating material.

The interlayer insulating layer 140 is provided with a contact hole. Accordingly, one side, for example, a left side, of the active layer A may be exposed by the contact hole, and the other side, for example, a right side, of the active layer A may be exposed.

The source electrode SE and the drain electrode DE may be formed on the interlayer insulating layer 140.

The source electrode SE is electrically connected to one side of the active layer A, and the drain electrode DE is electrically connected to the other side of the active layer A.

Specifically, the source electrode SE is connected to one side of the active layer A through the contact hole provided in the interlayer insulating layer 140, and the drain electrode DE is connected to the other side of the active layer A through the contact hole provided in the interlayer insulating layer 140.

The planarization layer 150 is provided on the source electrode SE and the drain electrode DE. A contact hole is provided in the planarization layer 150, and thus the source electrode SE is exposed. However, in some cases, the drain electrode DE may be exposed.

The first electrode 160 is formed on the planarization layer 150 and is connected to the source electrode SE or the drain electrode DE through the contact hole provided in the planarization layer 150. The first electrode 160 may function as an anode.

The bank layer 170 is provided to cover an edge of the first electrode 160 to define a light emitting area. Accordingly, an upper surface area of the first electrode 160 exposed without being covered by the bank layer 170 becomes a light emitting area.

The bank layer 170 may be formed of an organic layer such as an acrylic resin, an epoxy resin, a phenolic resin, a polyamide resin, or a polyimide resin, but it is not limited thereto.

The light emitting layer 180 is provided on the first electrode 160. The light emitting layer 180 may include red, green, and blue light emitting layers patterned for each pixel, or may be formed of a white light emitting layer connected to all pixels. When the light emitting layer 180 is formed of a white light emitting layer, the light emitting layer 180 may include, for example, a first stack including a blue light emitting layer, a second stack including a yellow green light emitting layer, and a charge generating layer provided between the first stack and the second stack, but is not limited thereto.

The second electrode 190 is provided on the light emitting layer 180. The second electrode 190 may function as a cathode.

The encapsulation layer 200 is formed on the second electrode 190.

The encapsulation layer 200 may include at least one inorganic layer and at least one organic layer to prevent or reduce oxygen or moisture from penetrating into the light emitting layer 180 and the second electrode 190. For example, the encapsulation layer 200 may include two inorganic layers and an organic layer provided between the two inorganic layers. The at least one inorganic layer may be formed of silicon nitride, aluminum nitride, zirconium nitride, titanium nitride, hafnium nitride, tantalum nitride, silicon oxide, aluminum oxide, or titanium oxide.

The first insulating layer 210 is formed on the encapsulation layer 200. The first insulating layer 210 may be formed of an inorganic layer or an organic layer. When the first insulating layer 210 is formed as an inorganic layer, it may be formed of a silicon oxide SiOx, a silicon nitride layer SiNx, or a multilayer of them. When the first insulating layer 210 is formed of an organic layer, the first insulating layer 210 may be subjected to plasma treatment on the first insulating layer 210 to roughen the surface roughness of the first insulating layer 210. In this case, since the area of the first insulating layer 210 in contact with the bridge electrodes BE may be increased, the interfacial adhesive force between the first insulating layer 210 and the bridge electrodes BE may be increased.

The bridge electrode BE may be formed on the first insulating layer 210.

One side of the bridge electrode BE, for example, the left side and the other side, for example, the right side, may be exposed to the outside by contact holes formed in the second insulating layer 220 and the third insulating layer 230.

The one side and the other side of the bridge electrode BE may be connected to the first sub-touch electrodes TEx through the contact hole, respectively. Therefore, since the first sub-touch electrodes TEx are electrically connected through the bridge electrode BE, the first touch electrodes TE may receive the same signal without short-circuiting the first touch electrode TE and the second touch electrode RE in a region where the first touch electrode TE and the second touch electrode RE intersect.

The dummy electrode BD may be formed on the first insulating layer 210.

The dummy electrode BD may be formed of the same material in the same process as the bridge electrode BE in the same layer.

The dummy electrode BD may be formed in a floating structure, where the floating structure means a structure that is not electrically connected with other components. Accordingly, the dummy electrode BD is not electrically connected to the first touch electrode TE and the second touch electrode RE.

The dummy electrode BD may overlap the first open part OP1, and may overlap a portion of the first sub-touch electrode TEx and the third sub-touch electrode REx.

According to an embodiment of present disclosure, since the dummy electrode BD overlaps the first open part OP1, a difference of reflectance between a region where the first open part OP1 is formed and a region where the first sub-touch electrode TEx and the third sub-touch electrode REx are formed may be reduced. Accordingly, the level of visibility by the plurality of open parts OP may be improved.

The second insulating layer 220 may be formed on the bridge electrode BE and the dummy electrode BD.

The second insulating layer 220 may prevent or reduce the third insulating layer 230 from being lifted between the bridge electrode BE and the third insulating layer 230. Since an interfacial adhesive force between the bridge electrode BE and the second insulating layer 220 is stronger than an interfacial adhesive force between the bridge electrode BE and the third insulating layer 230, a phenomenon being lifted between the bridge electrode BE and the third insulating layer 230 can be prevented or reduced by the second insulating layer 220.

Furthermore, the second insulating layer 220 may prevent or reduce oxygen or moisture from penetrating.

The second insulating layer 220 may be formed of, for example, a silicon oxide SiOx, a silicon nitride SiNx, or a multilayer film thereof.

The third insulating layer 230 may be formed on the second insulating layer 220.

The third insulating layer 230 may be formed of an organic layer, for example, photo acrylate.

The first touch electrode TE and the second touch electrode RE are formed on the third insulating layer 230.

According to an embodiment of present disclosure, the third sub-touch electrode REx and the first sub-touch electrode TEx are formed on the third insulating layer 230.

The first sub-touch electrodes TEx may be spaced apart from each other to be electrically connected through the bridge electrode BE.

The third sub-touch electrode REx (or the fourth sub-touch electrode REy) may be formed between the first sub-touch electrodes TEx. As the third sub-touch electrode REx is formed on the bridge electrode BE, the second touch electrode RE according to an embodiment of the present disclosure may be formed on the display panel 100 without being spaced apart.

Figure 11:
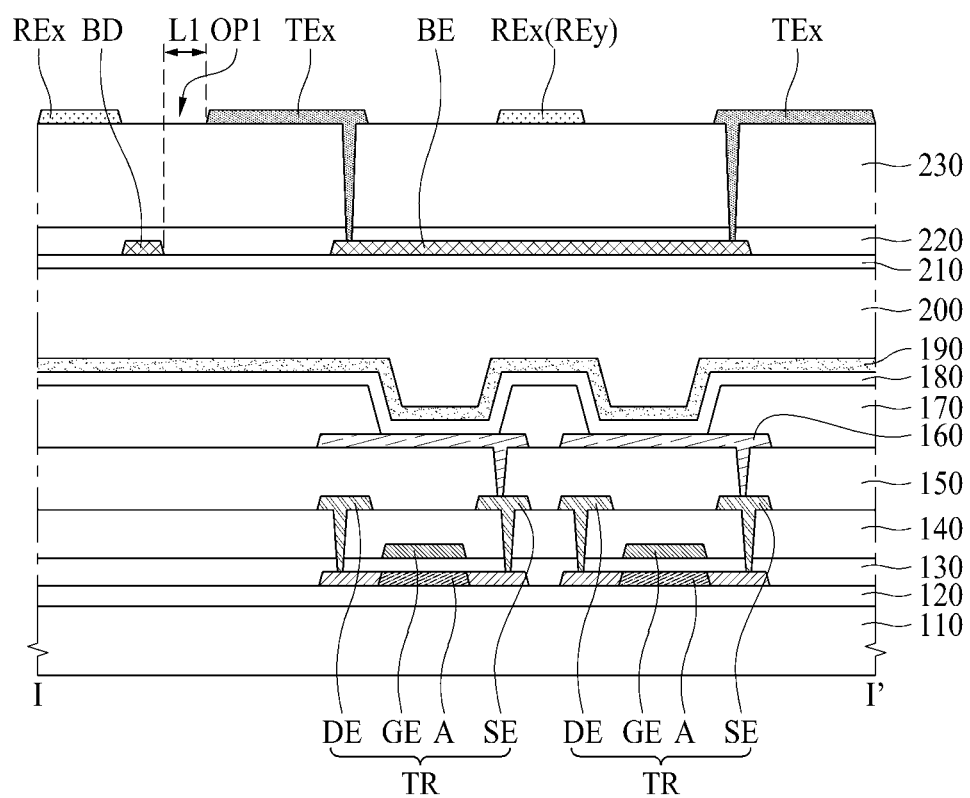
FIG. 11 is a cross-sectional view of a display device with the integrated touch screen according to another embodiment of the present disclosure. In this case, FIG. 11 corresponds to a cross section of line I-I' of FIG. 9.

FIG. 11 is a cross-sectional view of a touch electrode according to another embodiment of the present disclosure. In this case, FIG. 11 corresponds to a cross section of line I-I' of FIG. 9. Meanwhile, since the embodiment in accordance with FIG. 11 is the same as the embodiment in accordance with FIG. 10 except for the configuration of the dummy electrode BD, only different configurations will be described below.

According to another embodiment of the present disclosure, as shown in FIG. 11, the dummy electrode BD may not overlap the entire first open part OP1, but may overlap only a portion of the first open part OP1.

The dummy electrode BD may overlap only a portion of the third sub-touch electrode REx and may not overlap the first sub-touch electrode TEx. One end of the dummy electrode BD may be spaced apart from the first sub-touch electrode TEx by L1. Therefore, due to the dummy electrode BD, a reflectivity difference between the region where the first touch electrode TE and the second touch electrode RE are formed and the region where the first open part OP1 is formed may be reduced. Accordingly, the level of visibility according to an embodiment of the present disclosure may be improved. Also, as the dummy electrode BD may overlap only a portion of the third sub-touch electrode REx and may not overlap the first sub-touch electrode TEx, the parasitic capacity of the display device with the integrated touch screen according to an embodiment of the present disclosure may be reduced.

Figure 12:
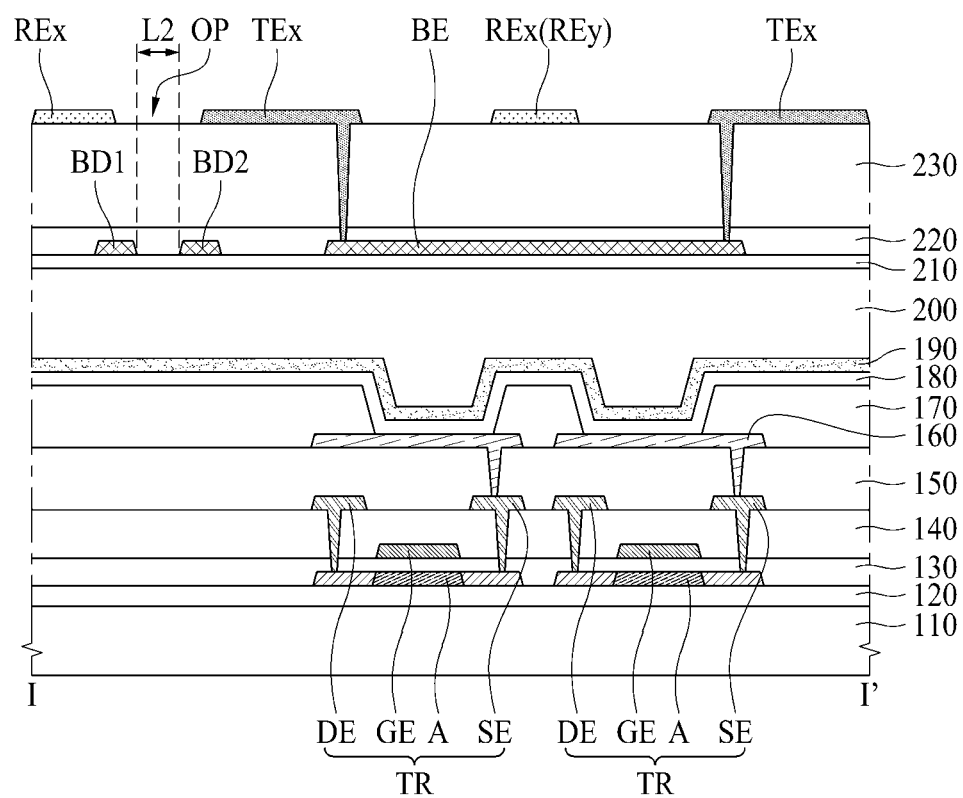
FIG. 12 is a cross-sectional view of a display device with the integrated touch screen according to another embodiment of the present disclosure. In this case, FIG. 12 corresponds to a cross section of line I-I' of FIG. 9.

FIG. 12 is a cross-sectional view of a touch electrode according to another embodiment of the present disclosure. In this case, FIG. 12 corresponds to a cross section of line I-I' of FIG. 9. Meanwhile, since the embodiment of FIG. 12 is the same as the embodiment of FIG. 10 except for the configuration of the dummy electrode BD, only different configurations will be described below.

According to another embodiment of the present disclosure, as shown in FIG. 12, the dummy electrode BD includes a first dummy electrode BD1 and a second dummy electrode BD2.

The first dummy electrode BD1 may overlap a portion of the first open part OP1 and the third sub-touch electrode REx, and the second dummy electrode BD2 may overlap another portion of the first open part OP1 and the first sub-touch electrode TEx.

The first dummy electrode BD1 and the second dummy electrode BD2 may be formed to be spaced apart by a length of L2. Therefore, due to the first dummy electrode BD1 and the second dummy electrode BD2, a reflectivity difference between the region where the first touch electrode TE and the second touch electrode RE are formed and the region where the first open part OP1 is formed may be reduced. Accordingly, the level of visibility according to an embodiment of the present disclosure may be improved. Also, as the first dummy electrode BD1 and the second dummy electrode BD2 may be formed to be spaced apart by a length of L2, the parasitic capacity of the display device with the integrated touch screen according to an embodiment of the present disclosure may be reduced.

Accordingly, the present disclosure may have the following advantages.

According to an embodiment of present disclosure, since the positions of the first and third open parts formed by the first and third sub-touch electrodes and the second and fourth open parts formed by the second and fourth sub-touch electrodes are controlled, the level of visibility may be improved by preventing the virtual line connecting the plurality of open parts from becoming a straight line.

According to an embodiment of present disclosure, since the shortest distance between the first open part and the plurality of the second sub-touch electrodes is shorter than the shortest distance between the first open part and the plurality of the fourth sub-touch electrodes, the shortest distance between the second open part and the plurality of the third sub-touch electrode is shorter than the shortest distance between the second open part and the plurality of the first sub-touch electrodes, the boundary region may be formed in zigzag to improve the level of visibility.

According to an embodiment of the present disclosure, since the first open parts and the second open parts is formed as above, and the blue pixel having the strongest light corresponds to any one of the plurality of second open areas including the first open part and the second open part, the level of the display device with the integrated touch screen may be improved.

the level of visibility of the display device with the integrated touch screen may be improved by forming the first open part and the second open part as above, and The blue pixel having the strongest intensity of light corresponds to any one of a plurality of second open areas including the first open parts and the second open parts. the level of visibility of the display device with the integrated touch screen may be improved."

According to an embodiment of present disclosure, since the first touch electrodes and the second touch electrodes is formed on the same layer as a bridge electrode connecting the first touch electrode in the region where the first touch electrode and the second touch electrode intersect, and the dummy electrode is formed to overlap the plurality of open parts, the level of visibility may be improved in a region where the plurality of the open parts is formed.

It will be apparent to those skilled in the art that various substitutions, modifications, and variations are possible within the scope of the present disclosure without departing from the spirit and scope of the present disclosure. Therefore, the scope of the present disclosure is represented by the following claims, and all changes or modifications derived from the meaning, range and equivalent concept of the claims should be interpreted as being included in the scope of the present disclosure.

What is claimed is:

1. A touch display device, comprising:
a first electrode having a plurality of first intersection points;
a second electrode having a plurality of second intersection points;
a first opening spaced from a first one of the first intersection points by a first distance, the first opening being provided in a boundary area where an end of the first electrode faces an end of the second electrode;
a second opening spaced from a second one of the first intersection points by a second distance that is different from the first distance;
a third opening spaced from the second one of the first intersection points by a third distance that is different from the second distance; and
a first dummy electrode aligned with the first opening, the first dummy electrode provided below the first electrode and the second electrode,
wherein the first, second, and third openings are located between the first electrode and the second electrode, and
wherein one of the first electrode and the second electrode receives a signal from a first touch driver and the other of the first electrode and the second electrode transmits a signal to a second touch driver.

2. The touch display device of claim 1, wherein the third distance is substantially the same as the first distance.

3. The touch display device of claim 1, comprising:
a substrate; and
wherein the first dummy electrode is on the substrate, the first and second electrode being spaced from the substrate by the first dummy electrode.

4. The touch display device of claim 1, wherein the first electrode overlaps a first side of the first dummy electrode and the second electrode overlaps a second side of the first dummy electrode.

5. The touch display device of claim 1, wherein the first dummy electrode is closer to the first electrode than to the second electrode.

6. The touch display device of claim 1, wherein the third distance is different from the first distance.

7. The touch display device of claim 6, wherein the third distance is larger than the first distance.

8. The touch display device of claim 1, wherein the first dummy electrode includes a first part and a second part that are spaced from each other.

9. The touch display device of claim 8, wherein the first part is closer to the first electrode and the second part is closer to the second electrode.

10. The touch display device of claim 9, wherein the first electrode overlaps the first part of the first dummy electrode and the second electrode overlaps the second part of the first dummy electrode.

11. A device, comprising:
a first touch electrode having a plurality of first extensions in a first direction that are coupled to a plurality of second extensions in a second direction that is transverse to the first direction;
a plurality of first intersection points based on an overlap of the plurality of first extensions and the plurality of second extensions;
a second touch electrode having a plurality of third extensions in the first direction that are coupled to a plurality of fourth extensions in the second direction;
a plurality of second intersection points based on an overlap of the plurality of third extensions and the plurality of fourth extensions;
a plurality of openings between the first touch electrode and the second touch electrode, the plurality of openings including:
a first opening adjacent to a first one of the plurality of first intersection points and between a first one of the plurality of first extensions and a first one of the plurality of third extensions, the first opening being provided in a boundary area where an end of the first touch electrode faces an end of the second touch electrode;
a second opening adjacent to a second one of the plurality of first intersection points and between a first one of the plurality of second extensions and a first one of the plurality of fourth extensions;
a third opening adjacent to the second one of the plurality of first intersection points and between a second one of the plurality of first extensions and a second one of the plurality of third extensions, the third opening being closer than the second opening from the second one of the plurality of first intersection points;
a fourth opening adjacent to a third one of the plurality of first intersection points and between a second one of the plurality of second extensions and a second one of the plurality of fourth extensions; and
a first dummy electrode aligned with the first opening, the first dummy electrode provided below the first touch electrode and the second touch electrode,
wherein the first one of the plurality of first intersection points, the second one of the plurality of first intersection points, and the third one of the plurality of first intersection points are in a linear configuration, and
wherein one of the first touch electrode and the second touch electrode receives a signal from a first touch driver and the other of the first touch electrode and the second touch electrode transmits a signal to a second touch driver.

12. The device of claim 11, wherein the fourth opening is adjacent to the third opening and closer to the third opening than the second opening.

13. The device of claim 12, wherein the first and third openings are aligned along a third direction that is transverse to the first direction and is transverse to the second direction.

14. The device of claim 13, wherein the second and fourth openings being aligned along the third direction.

15. A device, comprising:
a first touch electrode having a pattern of first extensions that intersect at a plurality of first intersection points;
a second touch electrode having a pattern of second extensions that intersect at a plurality of second intersection points;
a plurality of openings between first ends of the first touch electrode and second ends of the second touch electrode, the plurality of openings including:

a first opening at a first location between a first one of the first intersection points and a first one of the second intersection points, the first location being adjacent to the first one of the first intersection points, the first opening being provided in a boundary area where an end of the first touch electrode faces an end of the second touch electrode;

a second opening at a second location between a second one of the first intersection points and the first one of the second intersection points, the second location being adjacent to the second one of the first intersection points;

a third opening at a third location between a third one of the first intersection points and a second one of the second intersection points, the third location being adjacent to the third one of the first intersection points, a first line through the first, second, and third opening being non-linear; and a first dummy electrode aligned with the first opening, the first dummy electrode provided below the first touch electrode and the second touch electrode, wherein a second line through the first one of the first intersection points, the second one of the first intersection points, and the third one of the first intersection points is linear, and wherein the first to third openings are in communication with one another through open areas provided in a boundary area where an ends of the first touch electrode faces an ends of the second touch electrode.

16. The device of claim 15, wherein the first location is at a fourth distance from a first one of the second intersection points and the third location is at a fifth distance from a second one of the second intersection points, and the fourth distance is same as the fifth distance.

17. The device of claim 15, wherein the first location is at a fourth distance from a first one of the second intersection points and the third location is at a fifth distance from a second one of the second intersection points, and the fourth distance is larger than the fifth distance.

18. The device of claim 15, wherein the first location is at a first distance from the first one of the first intersection points and the second location is at a second distance from the second one of the first intersection points, the first distance being smaller than the second distance.

19. The device of claim 18, wherein the third location is at a third distance from the second one of the first intersection points, and the third distance is different from the second distance.

* * * * *